United States Patent
Ohgane et al.

(10) Patent No.: US 6,482,765 B1
(45) Date of Patent: Nov. 19, 2002

(54) MODIFIED PARTICLES, CARRIER PREPARED THEREFROM, OLEFIN POLYMERIZATION CATALYST COMPONENT PREPARED THEREFROM, OLEFIN POLYMERIZATION CATALYST PREPARED THEREFROM, AND PROCESS FOR PREPARING OLEFIN POLYMER

(75) Inventors: Takuya Ohgane, Sodegaura (JP); Hideki Sato, Niihama (JP); Hiroaki Katayama, Narashino (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/284,798

(22) PCT Filed: Aug. 20, 1998

(86) PCT No.: PCT/JP98/03680

§ 371 (c)(1),
(2), (4) Date: Jul. 6, 1999

(87) PCT Pub. No.: WO99/10389

PCT Pub. Date: Mar. 4, 1999

(30) Foreign Application Priority Data

Aug. 21, 1997 (JP) .............................. 9-225066

(51) Int. Cl.[7] .................. B01J 32/00; B01J 31/38
(52) U.S. Cl. ............... 502/104; 502/127; 502/152; 526/129; 526/160; 526/943
(58) Field of Search ................ 526/160, 943, 526/348.6, 129; 502/104, 126, 127, 152

(56) References Cited

U.S. PATENT DOCUMENTS

| | | |
|---|---|---|
| 4,397,762 A | 8/1983 | Johnstone et al. |
| 4,693,990 A | 9/1987 | Hiroyuki et al. ........... 502/116 |
| 4,808,561 A | 2/1989 | Welborn, Jr. ............... 502/104 |
| 4,897,455 A | 1/1990 | Welborn, Jr. ............... 526/129 |
| 4,912,075 A | 3/1990 | Chang ........................ 502/107 |
| 4,935,474 A | 6/1990 | Ewen et al. ................ 526/114 |
| 4,937,299 A | 6/1990 | Ewen et al. ................ 526/119 |
| 4,937,301 A | 6/1990 | Chang ........................ 526/128 |
| 5,234,878 A | 8/1993 | Tsutsui et al. ............. 502/103 |
| 5,324,800 A | 6/1994 | Welborn, Jr. et al. ...... 526/160 |
| 5,580,939 A | 12/1996 | Ewen et al. ............... 526/127 |
| 5,633,394 A | 5/1997 | Welborn, Jr. et al. ......... 556/11 |
| 5,700,749 A | 12/1997 | Tsutsui et al. ............. 502/117 |
| 6,100,213 A | * 8/2000 | Kumamoto et al. ........ 502/120 |

FOREIGN PATENT DOCUMENTS

| | | |
|---|---|---|
| DE | 19711304 A | 10/1997 |
| EP | 0037182 A1 | 10/1981 |
| EP | 0464744 A | 1/1992 |

(List continued on next page.)

Primary Examiner—David W. Wu
Assistant Examiner—R. Harlan
(74) Attorney, Agent, or Firm—Birch, Stewart, Kolasch & Birch, LLP

(57) ABSTRACT

Modified particles obtained by contacting dry particles(a) with an organometallic compound(b), and subsequently a compound(c) having a functional group containing active hydrogen or a non-proton donative Lewis basic functional group and an electron attractive group; a carrier comprising said particles; a catalyst component for olefin polymerization comprising said particles; a catalyst for olefin polymerization comprising said particles(A) and a transition metal compound(B), or an additional organometallic compound (C) therewith; and a method for producing an olefin polymer with said catalyst for olefin polymerization. According to the present invention, there is provided a catalyst for polymerizing an olefin giving an olefin polymer excellent in particle properties with a high activity when applied to a slurry polymerization or gas phase polymerization, and a method for producing a olefin polymer using said catalyst.

28 Claims, 1 Drawing Sheet

FOREIGN PATENT DOCUMENTS

| | | |
|---|---|---|
| EP | 0 658576 A1 | 6/1995 |
| EP | 0668295 A1 | 8/1995 |
| EP | 0725086 A2 | 8/1996 |
| JP | 60 35006 | 2/1985 |
| JP | 60 35007 | 2/1985 |
| JP | 60 35008 | 2/1985 |
| JP | 61 108610 | 5/1986 |
| JP | 61 276805 | 12/1986 |
| JP | 61 296008 | 12/1986 |
| JP | 62-007706 A | 1/1987 |
| JP | 63 51407 | 3/1988 |
| JP | 63 89505 | 4/1988 |
| JP | 1 207303 | 8/1989 |
| JP | 3 234710 | 10/1991 |
| JP | A06329713 | 5/1993 |
| JP | A-6-329713 * | 5/1993 |
| JP | 06-329713 A | 11/1994 |
| JP | 6 329713 | 11/1994 |
| JP | 6 336502 | 12/1994 |
| JP | 8 198909 | 8/1996 |
| JP | 08198909 A | 8/1996 |
| JP | 9 143217 | 6/1997 |
| JP | 09143217 A | 6/1997 |
| JP | 09-249707 A | 9/1997 |
| WO | WO 9109882 | 7/1991 |
| WO | WO 91/09882 * | 7/1991 |

* cited by examiner

MODIFIED PARTICLES, CARRIER PREPARED THEREFROM, OLEFIN POLYMERIZATION CATALYST COMPONENT PREPARED THEREFROM, OLEFIN POLYMERIZATION CATALYST PREPARED THEREFROM, AND PROCESS FOR PREPARING OLEFIN POLYMER

This application is the national phase under 35 U.S.C. §371 of PCT International Application No. PCT/JP98/03680 which has an International filing date of Aug. 20, 1998 which designated the United States of America.

TECHNICAL FIELD

The present invention relates to particles which are useful as a carrier and a catalyst component for olefin polymerization a catalyst for olefin polymerization using the same, and method for producing an olefin polymer using said catalyst for olefin polymerization.

BACKGROUND ARTS

A lot of reports on a method for producing an olefin polymer using a transition metal compound have already been made. As the example of using a metallocene transition metal compound, for example, Japanese Patent Publication (Kokai) No.58-19309 discloses a method of producing an olefin polymer using bis(cyclopentadienyl)zirconium dichloride and methylaluminoxane. Japanese Patent Publication(kohyo) No.1-502036 discloses a method of producing an olefin polymer using bis(pentamethylcyclopentadienyl)zirconium dimethyl and n-butylammonium tetrakisphenylborate. Japanese Patent Publication(Kokai) No.5-178923 discloses a method of producing an olefin polymer using dimethylsilylbis(2,4-dimethylcyclopentadienyl)zirconium dimethyl, dimethylanilinumtetrakis(pentafluorophenyl)borate and triethylaluminum. Furthermore, a lot of examples using a non-metallocene transition metal compound are disclosed in J. Amer. Chem. Soc., 115, 8493(1993), Plastics Engineering, March. 77(1996), WO96/23010 and the like.

Since catalysts using these transition metal compounds are soluble in a reaction system, when used in the polymerization accompanying formation of polymer particles (e.g. slurry polymerization, gas phase polymerization, etc.), the shape of the formed polymer is irregular to cause formation of large polymer particles, an agglomerate polymer and fine polymer particles, decrease in bulk density of the polymer, adhesion of the polymer to the polymerization reactor wall. Consequently, poor heat transfer and poor cooling in the reactor, and the like are caused, which results in difficulty in stable operation and lowering of the productivity.

In order to apply the transition metal compound to the polymerization accompanying formation of polymer particles (e.g. slurry polymerization, gas phase polymerization), it is necessary that not only sufficient polymerization activity is exerted but also the polymer excellent in shape and particle properties is obtained. To solve these problems, a method of supporting a transition metal compound on a carrier has been proposed.

As one method, for example, a method of fixing/supporting all or a part of a catalyst component such as metallocene complex, methylaluminoxane or the like on an inorganic metal oxide carrier such as silica or the like has been reported.

For example, Japanese Patent Publication(Unexamined) Nos. 60-35006, 60-35007 and 60-35008 respectively disclose a method of depositing/adhering a soluble metallocene on a typical support (e.g. silica, alumina, polyethylene, etc.) to convert into a supported heterogeneous catalyst and using a combination of the catalyst and aluminoxane in the slurry polymerization or gas phase polymerization.

Japanese Patent Publication (Unexamined) No. 61-108610 discloses a method of producing a polyolefin polymer using a solid catalyst component obtained by adding a calcined silica to bis(cyclopentadienyl)zirconium dichloride and a reaction product of trimethylaluminum and water.

Japanese Patent Publication(Unexamined) No. 61-276805 discloses a method of producing an olefin polymer using an inorganic oxide-containing organoaluminum component, obtained by reacting a mixture of methylaluminoxane and trimethylaluminum with silica, and bis(cyclopentadienyl)zirconium dichloride.

Japanese Patent Publication(Unexamined) No. 61-296008 discloses a method of producing an olefin polymer using a solid catalyst containing aluminum and zirconium, obtained by treating silica in turn with methylaluminoxane and bis(cyclopentadienyl)zirconium chloride.

As the improved method, for example, there have been reported a method of using a solid catalyst component obtained by fixing/supporting all or a part of a catalyst component such as metallocene complex, methylaluminoxane, etc. on an in organic metal oxide carrier such as silica, etc., and aluminoxane or organoaluminum, and a method of using a pre-polymerized catalyst obtained by carrying out prepolymerization. Japanese Patent Publication (Kokai) No.63-51407 discloses a method of producing an olefin polymer using a solid catalyst component obtained by treating silica in turn with methylaluminoxane and bis(cyclopentadienyl)zirconium dichloride, and methylaluminoxane.

Japanese Patent Publication (Kokai) No.63-89505 discloses a method of producing an olefin polymer using a solid catalyst component obtained by treating silica in turn with methylaluminoxane and bis(cyclopentadienyl)zirconium dichloride, and triisobutylaluminum or a method of producing an olefin polymer using a solid catalyst component pre-polymerized with the solid catalyst component and triisobutylaluminum.

In the above prior arts, use of aluminoxane is essential. This aluminoxane must be separately synthesized and a lot of steps are required and are complicated. The aluminoxane is unstable and costly. Regarding the solid catalyst component obtained by combining the aluminoxane with an inorganic metal oxide carrier such as silica, the amount of aluminum used is large and activity per 1 mol of an Al atom was low. To solve these problems, there has been reported a method of producing an olefin polymer using a solid catalyst component obtained by reacting an organoaluminum with water in the presence of an inorganic metal oxide carrier such as silica to form aluminoxane.

For example, Japanese Patent Publication (Kokai) No.61-31404 discloses a method of producing an olefin polymer using a catalyst obtained by adding water, trimethylaluminum and bis(cyclopentadienyl)zirconium dichloride in turn to silica.

Japanese Patent Publication (Kokai) No. 1-1207303 discloses a method of producing an olefin polymer using silica gel powders containing a supported metallocene-methylaluminoxane catalyst complex, obtained by adding silica gel not dehydrated, containing water to trimethylaluminum and treating the resultant with bis(n-butylcyclopentadienyl)zirconium dichloride.

Japanese Patent Publication (Kokai) No. 3-234710 discloses a method of producing an olefin polymer using a prepolymerized solid catalyst, obtained by adding water, trimethylaluminum and bis(methylcyclopentadienyl) zirconium dichloride in turn to silica and further adding ethylene to the mixture, and triisobutylaluminum.

According to these prior arts, synthesis of aluminoxane and fixing of the component to an inorganic metal oxide carrier such as silica or the like can be easily and simply performed. However, these methods require control of the amount of water used and it is difficult. Furthermore, the aluminoxane synthesized by this method and the solid catalyst component obtained by fixing the aluminoxane synthesized by this method have low activity, unlike separately synthesized aluminoxane and a solid catalyst component obtained by fixing the separately synthesized aluminoxane, and the particle properties of the resulting polymer are not preferred.

There has been reported a method of producing an olefin polymer using a solid catalyst component obtained from a metallocene transition metal compound, a boron compound and a carrier, or a solid catalyst component obtained from a metallocene transition metal compound, a boron compound, an organoaluminum compound and a carrier.

For example, Japanese Patent Publication (Kohyo) No.5-502906 discloses a method of producing an olefin polymer using a supported catalyst obtained by adding a reaction product of bis(cyclopentadienyl)zirconium dimethyl and N,N-dimethylaniliniumtetrakis(pentafluorophenyl)borate to basic alumina.

Japanese Patent Publication (Kokai) No. 6-336502 discloses a method of producing an olefin polymer using a solid catalyst component, obtained from a carrier prepared by treating silica with triethylaluminum, ethylenebisindenyl zirconium dichloride and N,N-dimethylanilinumtetrakis (pentafluorophenyl)borate, and further, triisobutylaluminum.

However, the boron compound used in these prior arts must be separately synthesized and a lot of steps are required and are complicated. Since the amount of the boron compound to be incorporated into a carrier such as silica is usually small and the reaction product of the metallocene transition metal compound and boron compound is generally unstable, the activity in case of polymerizing an olefin using the resulting solid catalyst component was low.

There have recently been reported a method of producing a catalyst for olefin polymerization using an aluminum compound wherein a special group is introduced, in place of aluminoxane and a boron compound, and a transition metal compound, or using them in combination with an organoaluminum compound, and a method of producing an olefin polymer using the same.

For example, Japanese Patent Publication(Unexamined) No. 6-329713 discloses a method of producing an olefin polymer using a solid component of an aluminum compound having an electron attractive group, obtained by reacting trimethylaluminum and pentafluorophenol, and bis (cyclopentadienyl)titanium dichloride. There is also described a method of producing a catalyst component by supporting an aluminum compound, wherein a special group is introduced, on an inorganic carrier or organic carrier. However, there is not disclosed the example of actually supporting the aluminum compound having an electron attractive group obtained by reacting trimethylaluminum with pentafluorophenol, and the polymerization activity in case of using a supported solid catalyst component as described in the publication was low.

Furthermore, there has recently been reported a catalyst for olefin polymerization, composed of a modified clay, obtained by treating a clay mineral with a compound capable of introducing a cation into layers, as a substitute of aluminoxane and a boron compound, a metallocene complex and an organoaluminum compound.

For example, Japanese Patent Publication (Kokai) No.7-224106 discloses a method of producing an olefin polymer using a modified clay obtained by using ferrocene, concentrated sulfuric acid and synthetic high purity montmorillonite, triisobutylaluminum and ethylenebis (indenyl)zirconium dichloride.

However, many clay minerals have irregular shape, particle diameter and particle properties and, moreover, olefin polymers obtained by using the clay minerals, contain a large amount of irregular matters in shape and particle properties. There is described that the modified clay is prepared in an aqueous solution to introduce a cation into layers of the clay mineral, however, water is essentially an inhibitor for olefin polymerization and complete removal of water from the modified clay was required but was difficult.

DISCLOSURE OF THE INVENTION

Under these circumstances, problems to be solved by the present invention, that is, an object of the present invention is to provide particles capable of giving a polymer having excellent shape and particle properties with high activity when a catalyst for olefin polymerization obtained by using a transition metal compound is applied to the polymerization accompanying formation of polymer particles (e.g. slurry polymerization, gas phase polymerization, etc.) by using in combination with the transition metal compound, a carrier consisting of said particles, a catalyst component for olefin polymerization consisting of said particles, a catalyst for olefin polymerization comprising said particles, and a method for producing an olefin polymer by using said catalyst for olefin polymerization.

To accomplish the above object, the present inventors have intensively investigated about a method for producing an olefin polymer with a transition metal compound, particularly a method for producing an olefin polymer according to the polymerization accompanying formation of polymer particles. As a result, the present inventors found modified particles obtained by contacting dry particles with a specific compound, and accomplished the present invention.

The present invention relates to modified particles obtained by contacting dry particles(a) with an organometallic compound(b), and subsequently a compound(c) having a functional group containing an active hydrogen or a non-proton donative Lewis basic functional group, and an electron attractive group.

Further, the present invention also relates to a carrier comprising said particles; a catalyst component for olefin polymerization, comprising said particles; a catalyst for olefin polymerization, comprising said particles(A) and a transition metal compound(B), or an additional organometallic compound(C) therewith; and a method for producing an olefin polymer with said catalyst for olefin polymerization.

The present invention will be explained in detail below.

(a) Dry Particles

The modified particles of the present invention are obtained by contacting dry particles(a) with an organometallic compound(b), and subsequently a compound(c) having a functional group containing active hydrogen or a non-proton donative Lewis basic functional group and an electron attractive group. The particles(a) used herein are dry and substantially contain no water, and substantially forms no aluminoxane by contact with trialkylaluminum.

As the particles(a), there can be preferably used those which are generally used as a carrier. A porous substance having a uniform particle diameter is preferred and an inorganic substance or an organic polymer is preferably used.

Examples of the inorganic substance which can be used as the particles(a) in the present invention include inorganic oxides and magnesium compounds, and clays and clay minerals can also be used unless no problem arises. These inorganic substances may be used in combination.

Specific examples of the inorganic oxide include $SiO_2$, $Al_2O_3$, $MgO$, $ZrO_2$, $TiO_2$, $B_2O_3$, $CaO$, $ZnO$, $BaO$, $ThO_2$ and mixtures thereof such as $SiO_2$—$MgO$, $SiO_2$—$Al_2O_3$, $SiO_2$—$TiO_2$, $SiO_2$—$V_2O_5$, $SiO_2$—$Cr_2O_3$, $SiO_2$—$TiO_2$—$MgO$, etc. Among these inorganic oxides, $SiO_2$ and/or $Al_2O_3$ are preferred. The above inorganic oxide may contain a small amount of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, $Li_2O$, etc.

Examples of the magnesium compound include magnesium halides such as magnesium chloride, magnesium bromide, magnesium iodide, magnesium fluoride and the like; alkoxymagnesium halides such as methoxymagnesium chloride, ethoxymagnesium chloride, isopropoxymagnesium chloride, butoxymagnesium chloride, octoxymagnesium chloride and the like; aryloxymagnesium halides such as phenoxymagnesium chloride, methylphenoxymagnesium chloride and the like; alkoxymagnesiums such as ethoxymagnesium, isopropoxymagnesium, butoxymagnesium, n-octoxymagnesium, 2-ethylhexoxymagnesium and the like; aryloxymagnesiums such as phenoxymagnesium, di-methylphenoxymagnesium and the like; magnesium carboxylates such as magnesium laurate, magnesium stearate and the like.

Among them, magnesium halides or alkoxymagnesiums are preferred, and magnesium chloride or butoxymagnesium is more preferred.

Examples of the clay or clay mineral include kaolin, bentonite, Kibushi clay, gaerome clay, allophane, hisingerite, pyrophylite, talc, a mica group, a montmorillinite group, vermiculite, a chlorite group, palygorskite, kaolinite, nacrite, dickite, halloycite and the like. Among them, smectite, montmorillinite, hectorite, raponite and saponite are preferred, and montmorillinite and hectorite are more preferred.

It is necessary that these inorganic substances are dried to substantially remove water, and those dried by a heat treatment are preferred. The heat treatment is normally carried out at the temperature of 100 to 1500° C., preferably 100 to 1000° C., and more preferably 200 to 800° C. There can be used a method of passing the heated inorganic substance through a dried inert gas (e.g. nitrogen, argon) at a fixed flow rate for a few hours or more, or a method of evacuating for several hours, but the method is not limited.

The average particle diameter of the inorganic substance is preferably from 5 to 1000 $\mu$m, more preferably from 10 to 500 $\mu$m, and most preferably from 10 to 100 $\mu$m. The pore volume is preferably not less than 0.1 ml/g, and more preferably 0.3 to 10 ml/g. The specific surface area is preferably from 10 to 1000 $m^2/g$, and more preferably from 100 to 500 $m^2/g$.

As the organic polymer used as the particles(a) in the present invention, any organic polymer may be used and a mixture of plural kinds of organic polymer may also be used. As the organic polymer, an organic polymer having a functional group capable of reacting with the organometallic compound(b) is preferred. Examples of the functional group include functional group containing active hydrogen and a non-proton donative Lewis basic functional group. As the organic polymer which can be used as the particles(a), a polymer having a functional group containing active hydrogen or a non-proton donative Lewis basic functional group is preferred.

The functional group containing active hydrogen may be any one containing an active hydrogen, and is not specifically limited. Specific examples thereof include a primary amino group, secondary amino group, imino group, amide group, hydrazide group, amidino group, hydroxy group, hydroperoxy group, carboxyl group, formyl group, carbamoyl group, sulfonic acid group, sulfinic acid group, sulfenic acid group, thiol group, thioformyl group, pyrrolyl group, imidazolyl group, piperidyl group, indazolyl group, carbazolyl group and the like. Among them, a primary amino group, secondary amino group, imino group, amide group, hydroxy group, formyl group, carboxyl group, sulfonic acid group or thiol group is preferred. A primary amino group, secondary amino group, imino group, amide group or hydroxy group is particularly preferred. These groups may be substituted with a halogen atom or a hydrocarbon group having 1 to 20 carbon atoms.

The non-proton donative Lewis basic functional group may be any functional group having a Lewis basic portion containing no active hydrogen atom, and is not specifically limited. Specific examples thereof include pyridyl group, N-substituted imidazolyl group, N-substituted indazolyl group, nitrile group, azido group, N-substituted imino group, N,N-substituted amino group, N,N-substituted aminoxy group, N,N,N-substituted hydrazino group, nitroso group, nitro group, nitroxy group, furyl group, carbonyl group, thiocarbonyl group, alkoxy group, alkyloxycarbonyl group, N,N-substituted carbamoyl group, thioalkoxy group, substituted sulfinyl group, substituted sulfonyl group, substituted sulfonic acid group and the like. A heterocyclic group is preferred, and an aromatic heterocyclic group having an oxygen atom and/or a nitrogen atom in the ring is more preferred. Among them, pyridyl group, N-substituted imidazolyl group and N-substituted indazoyl groups are particularly preferred and pyridyl group is most preferred. These groups may be substituted with a halogen atom or a hydrocarbon group having 1 to 20 carbon atoms.

The amount of the functional group containing active hydrogen or non-proton donative Lewis basic functional group is not specifically limited, but is preferably from 0.01 to 50 mmol/g, and more preferably from 0.1 to 20 mmol/g, in terms of a molar amount of the functional group per g of the organic polymer.

The organic polymer having said functional group can be obtained, for example, by polymerizing a monomer having a functional group containing active hydrogen or a non-proton donative Lewis basic functional group, or this monomer and another monomer. At this time, it is preferred to copolymerize the above monomers with a crosslinking polymerizable monomer having two or more polymerizable unsaturated bonds.

Examples of the monomer having a functional group containing active hydrogen or a non-proton donative Lewis basic functional group include the above monomer having a functional group containing active hydrogen, and a polymerizable unsaturated group or monomer having a functional group having a Lewis basic portion containing no active hydrogen, and a polymerizable unsaturated group.

Examples of the polymerizable unsaturated group include alkenyl groups such as vinyl group, allyl group and the like; alkynyl groups such as ethyne group and the like. Examples of the monomer having a functional group containing active hydrogen and a polymerizable unsaturated group include a vinyl group-containing primary amine, vinyl group-containing secondary amine, vinyl group-containing amide compound and vinyl group-containing hydroxy compound. Specific examples thereof include N-(1-ethenyl)amine, N-(2-propenyl)amine, N-(1-ethenyl)-N-methylamine, N-(2-propenyl)-N-methylamine, 1-ethenylamide, 2-propenylamide, N-methyl-(1-ethenyl)amide, N-methyl-(2-propenyl)amide, vinyl alcohol, 2-propen-1-ol, 3-buten-1-ol and the like.

Specific examples of the monomer having a functional group having a Lewis basic portion containing no active hydrogen, and a polymerizable unsaturated group include vinylpyridine, vinyl(N-substituted)imidazole and vinyl(N-substituted)indazole.

The other monomers having a polymerizable unsaturated group include ethylene, α-olefin and the like, and specific examples thereof include ethylene, propylene, butene-1, hexene-1, 4-methyl-pentene-1, styrene and the like. Among them, ethylene or styrene is preferred. Two or more kinds of these monomers may be used.

Specific examples of the crosslinking polymerizable monomer having two or more polymerizable unsaturated groups include divinylbenzene and the like.

The average particle diameter of the organic polymer is preferably from 5 to 1000 μm, and more preferably from 10 to 500 μm. The pore volume is preferably not less than 0.1 ml/g, and more preferably 0.3 to 10 ml/g. The specific surface area is preferably from 10 to 1000 m²/g, and more preferably from 50 to 500 m²/g.

(b) Organometallic Compound

The organometallic compound (b) used in the present invention is an organometallic compound represented by the following general formula (1):

$$R^1_n AX_{q-n} \quad (1)$$

(wherein A represents a metal atom of the 2nd, 12th or 13th Group of the Periodic Table of Element(IUPAC 1993); $R^1$ represents a hydrocarbon group having 1 to 20 carbon atoms or a hydrocarbonoxy group having 1 to 20 carbon atoms and a plurality of $R^1$ may be the same or different; X represents a halogen atom or a hydrogen atom; n represents a number satisfying the expression $0<n\leq q$; and q is a valence number of the metal atom.).

A above preferably includes a boron atom, aluminum atom, magnesium atom, zinc atom and the like. When A is a boron atom or aluminum atom, the valence number is 3 (q=3)m, and when A is magnesium atom or zinc atom, the valence number is 2(q=2). When A is a boron atom, $R^1$ is preferably the hydrocarbon group described above, and specific examples of thereof include trialkylboranes such as trimethylborane, triethylborane, tripropylborane, tributylborane, triphenylborane and the like; dialkylhalidoboranes such as dimethylchloroborane, diethylchloroborane, dipropylchloroborane, dibutylchloroborane, diphenylchloroborane and the like; dialkylhydrideborane such as dimethylhydridoborane, diethylhydridoborane, dipropyldihydridoborane, dibutylhydridoborane, diphenylhydridoborane and the like; alkyldihalideborane such as methyldichloroborane, ethyldichloroborane, propyldichloroborane, butyldichloroborane, phenyldichloroborane and the like.

When A is an aluminum atom, $R^1$ is preferably the hydrocarbon group described above, and specific examples of thereof include trialkylaluminums such as trimethylaluminum, triethylaluminum, tri-n-propylaluminum, triisopropylaluminum, tri-n-butylaluminum, triisobutylaluminum, tri-n-hexylaluminum and the like; dialkylaluminum halides such as dimethylaluminum chloride, diethylaluminum halide, di-n-propylaluminum chloride, diisopropylaluminum chloride, di-n-butylaluminum chloride, diisobutylaluminum chloride, di-n-hexylaluminum chloride and the like; alkylaluminum dihalides such as methylaluminum dichloride, ethylaluminum dichloride, n-propylaluminum dichloride, isopropylaluminumdichloride, n-butylaluminumdichloride, isobutylaluminum dichloride, n-hexylaluminum dichloride and the like; dialkylaluminumhydrides such as dimethylaluminumhydride, diethylaluminumhydrido, di-n-propylaluminumhydride, diisopropylaluminumhydride, di-n-butylaluminumhydride, diisobutylaluminumhydride, di-n-hexylaluminumhydride and the like.

Trialkylaluminums are preferred, and trimethylaluminum, triethylaluminum, triisobutylaluminum, tri-n-butylaluminum and tri-n-hexylaluminum are more preferred. Among them, trimethylaluminum, triethylaluminum and triisobutylaluminum are particularly preferred.

When A is a magnesium atom, $R^1$ is preferably the hydrocarbon group described above, and specific examples of thereof include diethylmagnesium, di-n-butylmagnesium and the like, and there is also included di-n-butoxymagnesium in which $R^1$ is the hydrocarbonoxy group described above. And, when A is a zinc atom, $R^1$ is preferably the hydrocarbon group described above, and specific examples of thereof include diethylzinc and the like.

The organometallic compound(b) is more preferably an organoaluminum compound and organoboron compound, and an organoaluminum compound is most preferred.

(c) Compound Having a Functional Group Containing Active Hydrogen or a Non-proton Donative Lewis Basic Functional Group, and an Electron Attractive Group The functional group containing active hydrogen or non-proton donative Lewis basic functional group of the compound(c) used in the present invention normally reacts with the organometallic compound.

The functional group containing active hydrogen and non-proton donative Lewis basic functional group are the same as those described herein-above.

The compound(c) has an electron attractive group, but a substituent constant σ of Hammett's rule can be used as an index of the electron attractive group. A functional group wherein the substituent constant σ of Hammett's rule is positive corresponds to the electron attractive group.

Specific examples of the electron attractive group include a fluorine atom, chlorine atom, bromine atom, iodine atom, cyano group, nitro group, phenyl group, acetyl group, carbonyl group, thionyl group, sulfone group, carboxyl group and the like.

In the compound(c), a functional group containing active hydrogen and a non-proton donative Lewis basic functional group may be the same. And, the compound(c) may have plural kinds and/or a plurality of functional groups containing active hydrogen or non-proton donative Lewis basic functional groups, and electron attractive groups. Examples of the compound(c) include amines, phosphines, alcohols, phenols, thiols, thiophenols, carboxylic acids and sulfonic acids, having an electron attractive group, and the like.

The compound (c) is preferably a compound represented by the following general formula (2):

$$R^2_m ZH_{z-m} \qquad \text{General formula (2)}$$

(wherein $R^2$ represents an electron attractive group or a group containing an electron attractive group; Z represents an atom of the 15th or 16th Group of the Periodic Table; H represents a hydrogen atom; and z represents a valence of Z, provided m is 1 when z is 2 and m is 1 or 2 when z is 3).

Examples of the group containing an electron attractive group in $R^2$ of the general formula (2) include a halogenated alkyl group, halogenated aryl group, cyanated aryl group, nitrated aryl group, ester group and the like.

Specific examples of the halogenated alkyl group include fluoromethyl group, chloromethyl group, bromomethyl group, iodomethyl group, difluoromethyl group, dichloromethyl group, dibromomethyl group, diiodomethyl group, trifluoromethyl group, trichloromethyl group, tribromomethyl group, triiodomethyl group, 2,2,2-trifluoroethyl group, 2,2,2-trichloroethyl group, 2,2,2-tribromoethyl group, 2,2,2-triiodoethyl group, 2,2,3,3,3-pentafluoropropyl group, 2,2,3,3,3-pentachloropropyl group, 2,2,3,3,3-pentabromopropyl group, 2,2,3,3,3-pentaiodopropyl group, 2,2,2-trifluoro-1-trifluoromethylethyl group, 2,2,2-trichloro-1-trichloromethylethyl group, 2,2,2-tribromo-1-tribromomethylethyl group, 2,2,2-triiodo-1-triiodomethylethyl group, 1,1,1,3,3,3-hexafluoro-2-trifluoromethylpropyl group, 1,1,3,3,3-hexachloro-2-trichloromethylpropylgroup, 1,1,3,3,3-hexabromo-2-tribromomethylpropyl group, 1,1,3,3,3-hexaiodo-2-triiodomethylpropyl group and the like.

Specific examples of the halogenated aryl group include 2-fluorophenyl group, 3-fluorophenyl group, 4-fluorophenyl group, 2-chlorophenyl group, 3-chlorophenyl group, 4-chlorophenyl group, 2-bromophenyl group, 3-bromophenyl group, 4-bromophenyl group, 2-iodophenyl group, 3-iodophenyl group, 4-iodophenyl group, 2,6-difluorophenyl group, 3,5-difluorophenyl group, 2,6-dichlorophenyl group, 3,5-dichlorophenyl group, 2,6-dibromophenyl group, 3,5-dibromophenyl group, 2,6-diiodophenyl group, 3,5-diiodophenyl group, 2,4,6-trifluorophenyl group, 2,4,6-trichlorophenyl group, 2,4,6-tribromophenyl group, 2,4,6-triiodophenyl group, pentafluorophenyl group, pentachlorophenyl group, pentabromophenyl group, pentaiodophenyl group, 2-(trifluoromethyl)phenyl group, 3-(trifluoromethyl)phenyl group, 4-(trifluoromethyl)phenyl group, 2,6-di(trifluoromethyl)phenyl group, 3,5-di(trifluoromethyl)phenyl group, 2,4,6-tri(trifluoromethyl)phenyl group and the like.

Specific examples of the cyanated aryl group include 2-cyanophenyl group, 3-cyanophenyl group, 4-cyanophenyl group and the like.

Specific examples of the nitrated aryl group include 2-nitrophenyl group, 3-nitrophenyl group, 4-nitrophenyl group and the like.

Specific examples of the ester group include methoxycarbonyl group, ethoxycarbonyl group, n-propyloxycarbonyl group, isopropyloxycarbonyl group, phenoxycarbonyl group, trifluoromethyloxycarbonyl group, pentafluorophenyloxycarbonyl group and the like.

$R^2$ of the general formula (2) is preferably a halogenated alkyl or halogenated aryl group, more preferably a fluoromethyl group, difluoromethyl group, trifluoromethyl group, 2,2,2-trifluoroethyl group, 2,2,3,3,3-pentafluoromethyl group, 2,2,2-trifluoro-1-trifluoromethylethyl group, 1,1,1,3,3,3-hexafluoro-2-trifluoromethylpropyl group, 4-fluorophenyl group, 2,6-difluorophenyl group, 3,5-difluorophenyl group, 2,4,6-trifluorophenyl group or pentafluorophenyl group, more preferably a trifluoromethyl group, 2,2,2-trifluoro-1-trifluoromethylethyl group, 1,1,1,3,3,3-hexafluoro-2-trifluoromethylpropyl group or pentafluorophenyl group.

Z in the general formula (2) represents an atom of the 15th or 16th Group of the Periodic Table, and H represents a hydrogen atom. Specific examples of Z include a nitrogen atom, phosphorus atom, oxygen atom, sulfur atom and the like. Among them, a nitrogen atom or oxygen atom is preferred and an oxygen atom is more preferred.

z represents a valence of Z. For example, z is 3 when Z is a nitrogen atom or a phosphorus atom, whereas, z is 2 when Z is am oxygen atom or a sulfur atom. m is 1 when z is 2, whereas, m is 1 or 2 when z is 3.

Specific examples of the amines described as for the compound(c) include di(fluoromethyl)amine, di(chloromethyl)amine, di(bromomethyl)amine, di(iodomethyl)amine, di(difluoromethyl)amine, di(dichloromethyl)amine, di(dibromomethyl)amine, di(diiodomethyl)amine, di(trifluoromethyl)amine, di(trichloromethyl)amine, di(tribromomethyl)amine, di(triiodomethyl)amine, di(2,2,2-trifluoroethyl)amine, di(2,2,2-trichloroethyl)amine, di(2,2,2-tribromoethyl)amine, di(2,2,2-triiodoethyl)amine, di(2,2,3,3,3-pentafluoroopropyl)amine, di(2,2,3,3,3-pentachloropropyl)amine, di(2,2,3,3,3-pentabromopropyl)amine, di(2,2,3,3,3-pentaiodopropyl)amine, di(2,2,2-trifluoro-1-trifluoromethylethyl)amine, di(2,2,2-trichloro-1-trichloromethylethyl)amine, di(2,2,2-tribromo-1-tribromomethylethyl)amine, di(2,2,2-triiodo-1-triiodomethylethyl)amine, di(1,1,1,3,3,3-hexafluoro-2-trifluoromethylpropyl)amine, di(1,1,1,3,3,3-hexachloro-2-trichloromethylpropyl)amine, di(1,1,1,3,3,3-hexabromo-2-tribromomethylpropyl)amine, di(1,1,1,3,3,3-hexaiodo-2-triiodomethylpropyl)amine, di(2-fluorophenyl)amine, di(3-fluorophenyl)amine, di(4-fluorophenyl)amine, di(2-chlorophenyl)amine, di(3-chlorophenyl)amine, di(4-chlorophenyl)amine, di(2-bromophenyl)amine, di(3-bromophenyl)amine, di(4-bromophenyl)amine, di(2-iodophenyl)amine, di(3-iodophenyl)amine, di(4-iodophenyl)amine, di(2,6-difluorophenyl)amine, di(3,5-difluorophenyl)amine, di(2,6-dichlorophenyl)amine, di(3,5-dichlorophenyl)amine, di(2,6-dibromophenyl)amine, di(3,5-dibromophenyl)amine, di(2,6-diiodophenyl)amine, di(3,5-diiodophenyl)amine, di(2,4,6-trifluorophenyl)amine, di(2,4,6-trichlorophenyl)amine, di(2,4,6-tribromophenyl)amine, di(2,4,6-triiodophenyl)amine, di(pentafluorophenyl)amine, di(pentachlorophenyl)amine, di(pentabromophenyl)amine, di(pentaiodophenyl)amine, di(2-(trifluoromethyl)phenyl)amine, di(3-(trifluoromethyl)phenyl)amine, di(4-(trifluoromethyl)phenyl)amine, di(2,6-di(trifluoromethyl)phenyl)amine, di(3,5-di(trifluoromethyl)phenyl)amine, di(2,4,6-tri(trifluoromethyl)phenyl)amine, di(2-cyanophenyl)amine, di(3-cyanophenyl)amine, di(4-cyanophenyl)amine, di(2-nitrophenyl)amine, di(3-nitrophenyl)amine, di(4-nitrophenyl)amine and the like. There can also be exemplified phosphine compounds wherein the nitrogen atom is replaced with a phosphorous atom. Those phosphine compounds are compounds represented by replacing amine of the above specific examples with phosphine.

Specific examples of the alcohols described as for the compound(c) include fluoromethanol, chloromethanol, bromomethanol, iodomethanol, difluoromethanol, dichloromethanol, dibromomethanol, diiodomethanol, trifluoromethanol, trichloromethanol, tribromomethanol, triiodomethanol, 2,2,2-trifluoroethanol, 2,2,2-trichloroethanol, 2,2,2-tribromoethanol, 2,2,2-triiodoethanol, 2,2,3,3,3-pentafluoropropanol, 2,2,3,3,3-pentachloropropanol, 2,2,3,3,3-pentabromopropanol, 2,2,3,3,3-pentaiodopropanol, 2,2,2-trifluoro-1-trifluoromethylethanol, 2,2,2-trichloro-1- trichloromethylethanol, 2,2,2-tribromo-1-tribromomethylethanol, 2,2,2-triiodo-1-triiodomethylethanol, 1,1,1,3,3,3-hexafluoro-2-trifluoromethylpropanol, 1,1,1,3,3,3-hexachloro-2-trichloromethylpropanol, 1,1,1,3,3,3-hexabromo-2-tribromomethylpropanol, 1,1,1,3,3,3-hexaiodo-2-triiodomethylpropanol and the like. There can also be exemplified thiol compounds wherein the oxygen atom is replaced with a sulfur atom. Those thiol compounds are compounds represented by replacing methanol of the above specific examples with methanethiol, replacing ethanol with ethanethiol and replacing propanol with propanethiol, respectively, and the like.

Specific examples of the phenols described as for the compound(c) include 2-fluorophenol, 3-fluorophenol, 4-fluorophenol, 2-chlorophenol, 3-chlorophenol, 4-chlorophenol, 2-bromophenol, 3-bromophenol, 4-bromophenol, 2-iodophenol, 3-iodophenol, 4-iodophenol, 2,6-difluorophenol, 3,5-difluorophenol, 2,6-dichlorophenol, 3,5-dichlorophenol, 2,6-dibromophenol, 3,5-dibromophenol, 2,6-diiodophenol, 3,6-diiodophenol, 2,4,6-trifluorophenol, 2,4,6-trichlorophenol, 2,4,6-tribromophenol, 2,4,6-triiodophenol, pentafluorophenol, pentachlorophenol, pentabromophenol, pentaiodophenol, 2-(trifluoromethyl)phenol, 3-(trifluoromethyl)phenol, 4-(trifluoromethyl)phenol, 2,6-di(trifluoromethyl)phenol, 3,5-di(trifluoromethyl)phenol, 2,4,6-tri(trifluoromethyl)phenol, 2-cyanophenol, 3-cyanophenol, 4-cyanophenol, 2-nitrophenol, 3-nitrophenol, 4-nitrophenol and the like. There can also be exemplified thiophenol compounds wherein the oxygen atom is substituted with a sulfur atom. Those thiophenol compounds are compounds represented by substituting phenol of the above specific examples with thiophenol.

Specific examples of the carboxylic acids described as for the compound(c) include 2-fluorobenzoic acid, 3-fluorobenzoic acid, 4-fluorobenzoic acid, 2,3-difluorobenzoic acid, 2,4-difluorobenzoic acid, 2,5-difluorobenzoic acid, 2,6-difluorobenzoic acid, 2,3,4-trifluorobenzoic acid, 2,3,5-trifluorobenzoic acid, 2,3,6-trifluorobenzoic acid, 2,4,5-trifluorobenzoic acid, 2,4,6-trifluorobenzoic acid, 2,3,4,5-tetrafluorobenzoic acid, 2,3,4,6-tetrafluorobenzoic acid, pentafluorobenzoic acid, fluoroacetic acid, difluoroacetic acid, trifluoroacetic acid, pentafluoroethylcarboxylic acid, heptafluoropropylcarboxylic acid, 1,1,1,3,3,3-hexafluoro-2-propylcarboxylic acid and the like.

Specific examples of the sulfonic acids as for the compound(c) include fluoromethanesulfonic acid, difluoromethanesulfonic acid, trifluoromethanesulfonic acid, pentafluoroethanesulfonic acid, heptafluoropropanesulfonic acid, 1,1,1,3,3,3-hexafluoro-2-propanesulfonic acid and the like.

Preferred examples of the amines as for the compound(c) include di(trifluoromethyl)amine, di(2,2,2-trifluoroethyl)amine, di(2,2,3,3,3-pentafluoropropyl)amine, di(2,2,2-trifluoro-1-trifluoromethylethyl)amine, di(1,1,1,3,3,3-hexafluoro-2-trifluoromethylpropyl)amine and di(pentafluorophenyl)amine; preferred examples of the alcohols include trifluoromethanol, 2,2,2-trifluoroethanol, 2,2,3,3,3-pentafluoropropanol, 2,2,2-trifluoro-1-trifluoromethylethanol and 1,1,1,3,3,3-hexafluoro-2-trifluoromethylpropanol; preferred examples of the phenols include 2-fluorophenol, 3-fluorophenol, 4-fluorophenol, 2,6-difluorophenol, 3,5-difluorophenol, 2,4,6-trifluorophenol, pentafluorophenol, 2-(trifluoromethyl)phenol, 3-(trifluoromethyl)phenol, 4-(trifluoromethyl)phenol, 2,6-di(trifluoromethyl)phenol, 3,5-di(trifluoromethyl)phenol and 2,4,6-tri(trifluoromethyl)phenol; preferred examples of the carboxylic acids include pentafluorobenzoic acid and trifluoroacetic acid; and preferred examples of the sulfonic acids include trifluoromethanesulfonic acid.

More preferred examples of the compound(c) include di(trifluoromethyl)amine, di(pentafluorophenyl)amine, trifluoromethanol, 2,2,2-trifluoro-1-trifluoroethanol, 1,1,1,3,3,3-hexafluoro-2-trifluoromethylpropanol, 4-fluorophenol, 2,6-difluorophenol, 2,4,6-trifluorophenol, pentafluorophenol, 4-(trifluoromethyl)phenol, 2,6-di(trifluoromethyl)phenol and 2,4,6-tri(trifluoromethyl)phenol, more preferably pentafluorophenol or 1,1,1,3,3,3-hexafluoro-2-trifluoromethylpropanol (common use name: perfluoro-tert-butanol).

(A) Modified Particles

The modified particles of the present invention is obtained by contacting dry particles(a) with an organometallic compound(b), and then a compound(c) having a functional group containing active hydrogen or a non-proton donative Lewis basic functional group and an electron attractive group.

It is preferable that the contact treatment of (a) with (b), and subsequent contact treatment with (c) are carried out under an inert gas atmosphere.

The treating temperature is normally within the range from −80 to 200° C., preferably from −20 to 150° C., and more preferably from 0 to 100° C. The treating time is normally from 1 minute to 48 hours, and preferably from 10 minutes to 24 hours. It is preferred to use a solvent and the solvent used is preferably an aliphatic or aromatic hydrocarbon solvent, which is inert to (a), (b) and (c). Examples of the aliphatic hydrocarbon solvent include butane, pentane, hexane, heptane, octane and the like; and examples of the aromatic hydrocarbon solvent include benzene, toluene, xylene and the like. There can also be used those obtained by optionally mixing these hydrocarbon solvents.

In the case of the contact of (a) with (b), and the subsequent contact with (c), the method of contacting (a) with (b), and the method of the following contacting with (c) may be the same or different.

The contact treated particles in each contacting step may be not subjected to isolation operation, but it is preferable to isolate each the treated particles after each of contact of (a) with (b), and contact of thus contact-treated particles with (c), respectively. As examples of the isolating method, there can be included a method of decantation of the supernatant of the reaction solution, method of washing the treated particles with an inert solvent after filtration, method of washing the treated particles with an inert solvent after filtration and drying them under reduced pressure or an inert gas flow, method of distilling off the solvent of the reaction solution under reduced pressure or an inert gas flow, and the like. Alternatively, when the isolation of the treated particles obtained as described above is not conducted, the particles obtained in the reaction liquid may be used in the polymerization in a state of being suspended in the inert solvent.

Regarding the amount of (b) to (a) in the preparation of the modified particles of the present invention, the metal atom of the organometallic compound(b) contained in the particles obtained by contacting (a) with (b) is preferably not less than 0.1 mmol, and more preferably 0.5 to 20 mmol, in terms of the number of mol of the metal atom contained in 1 g of the particles in the dry state. Regarding the amount of (c), the molar ratio of the compound(c) having a functional group containing active hydrogen or a non-proton donative Lewis basic functional group, and an electron attractive group to the organometallic compound (b) contained in 1 g of particles in the dry state, i.e. (c)/(b), is preferably from 0.01 to 100, more preferably from 0.05 to 5, and most preferably from 0.1 to 2.

The modified particles of the present invention can be used as a carrier for supporting a catalyst component for olefin polymerization, such as a transition metal compound, and is suitably used in the polymerization accompanying formation of polymer particles. The modified particles of the present invention can functions as a catalyst component for olefin polymerization. Examples of the catalyst for olefin polymerization using the modified particles of the present include those obtained by using modified particles(A) and a transition metal compound(B), and those obtained using modified particles(A), a transition metal compound(B) and an organometallic compound(C).

(B) Transition Metal Compound

The transition metal compound used in the present invention may be any transition metal compound having olefin polymerization activity, and the transition metal is preferably a transition metal of the 4th Group or lanthanide series of the Periodic Table of the Elements (1993, IUPAC). The transition metal compound is a metallocene transition metal compound, more preferably.

The metallocene transition metal compound is, for example, a compound represented by the following general formula (3):

$$ML_a R^3_{p-a} \qquad (3)$$

(wherein M represents a transition metal of the 4th Group or lanthanide series of the Periodic Table of the Elements (1993, IUPAC); L represents a group having a cyclopentadiene type anion skeleton or a group having a hetero atom, at least one of which is a group having a cyclopentadiene type anion skeleton, and a plurality of L may be the same or different and may be crosslinked each other; $R^3$ represents a hydrocarbon group having 1 to 20 carbon atoms; a represents a number satisfying the expression 0<a≦p; and p represents a valence of a transition metal atom M).

In the general formula (3) representing the metallocene transition metal compound, M is a transition metal of the 4th Group or lanthanide series of the Periodic Table of the Elements (1993, IUPAC). Specific examples of the transition metal of the 4th Group include titanium atom, zirconium atom, hafnium atom and the like; and examples of the transition metal atom of lanthanide series include samarium and the like. Among them, titanium atom, zirconium atom or hafnium atom is preferred.

In the general formula (3) representing the metallocene transition metal compound, L is a group having a cyclopentadiene type anion skeleton or a group having a hetero atom, at least one of which is a group having a cyclopentadiene type anion skeleton. A plurality of L may be the same or different and may be crosslinked each other. Examples of the a group having a cyclopentadiene type anion skeleton include $\eta^5$-cyclopentadienyl group, $\eta^5$-substituted-cyclopentadienyl or polycyclic group having a cyclopentadiene type anion skeleton. Examples of the substituent of the $\eta^5$-substituted cyclopentadienyl group include hydrocarbon group having 1 to 20 carbon atoms, halogenated hydrocarbon group having 1 to 20 carbon atoms or silyl group having 1 to 20 carbon atoms. Examples of the polycyclic group having a cyclopentadiene form anion skeleton include $\eta^5$-indenyl group, $\eta^5$-fluorenyl group and the like.

Examples of the hetero atom in the group having a hetero atom include a nitrogen atom, phosphorus atom, oxygen atom, sulfur atom and the like. Examples of the group having such a hetero atom include hydrocarbon amino group, hydrocarbon phosphino group, hydrocarbon oxy group, hydrocarbon thio group and the like, and preferred examples thereof include alkoxy group, aryloxy group, alkylthio group, arylthio group, dialkylamino group, diarylamino group, dialkylphosphino group or diarylphosphino group.

Specific examples of the $\eta^5$-substituted-cyclopentadienyl group include $\eta^5$-methylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-isobutylcyclopentadienyl group, $\eta^5$-sec-butylcyclopentadienyl group, $\eta^5$-tert-butylcyclopentadienyl group, $\eta^5$-1,2-dimethylcyclopentadienyl group, $\eta^5$-1,3-dimethylcyclopentadienyl group, $\eta^5$-1,2,3-trimethylcyclopentadienyl group, $\eta^5$-1,2,4-trimethylcyclopentadienyl group, $\eta^5$-teramethylcyclopentadienyl group, $\eta^5$-pentamethylcyclopentadienyl group, $\eta^5$-trimethylsilylcyclopentadienyl group and the like.

Specific examples of the polycyclic group having a cyclopentadiene type anion skeleton include $\eta^5$-indenyl group, $\eta^5$-2-methylindenyl group, $\eta^5$-4-methylindenyl group, $\eta^5$-4,5,6,7-tetarhydroindenyl group, $\eta^5$-fluorenyl group and the like.

Specific examples of the group having a hetero atom include methoxy group, ethoxy group, propoxy group, butoxy group, phenoxy group, thiomethoxy group, dimethylamino group, diethylamino group, dipropylamino group, dibutylamino group, diphenylamino group, pyrrolyl group, dimethylphisphino group and the like.

Groups having a cyclopentadiene type anion skeleton, or a group having a cylopentadienyl group and a group having a hetero atom may be crosslinked. In that case, an alkylene group such as ethylene group, propylene group or the like, a substituted alkylene group such as dimethylmethylene group, diphenylmethylene group or the like, or a substituted silylene group such as silylene group, dimethylsilylene group, diphenylsilylene group, tetramethyldisilylene group or the like may be lie therebetween.

$R^3$ in the general formula (3) representing the metallocene transition metal compound is a halogen atom or a hydrocarbon group having 1 to 20 carbon atoms a is a number satisfying the expression 0<a≦p and p is a valence of a transition metal atom M). Specific examples of $R^3$ include halogen atom such as fluorine atom, chlorine atom, bromine atom, iodine atom or the like; and hydrocarbon group having 1 to 20 carbon atoms such as methyl group, ethyl group, n-propyl group, isopropyl group, n-butyl group, phenyl group, benzyl group and the like. Preferred examples of $R^3$ include chlorine atom, methyl group or benzyl group.

Among the metallocene transition metal compounds represented by the above general formula (3), specific examples of the compound wherein the transition metal atom M is a zirconium atom, include bis(cyclopentadienyl)zirconium dichloride, bis(n-butylcyclopentadienyl)zirconium dichloride, bis(1,3-dimethylcyclopentadienyl)zirconium dichloride, bis(methylcyclopentadienyl)zirconium dichloride, bis(pentamethylcyclopentadienyl)zirconium dichloride, bis(indenyl)zirconium dichloride, bis(4,5,6,7-tetrahydroindenyl)zirconium dichloride, bis(fluorenyl)zirconium dichloride, ethylenebis(indenyl)zirconium dichloride, ethylenebis(4,5,6,7-tetrahydroindenyl)zirconium dichloride, ethylenebis(2-methylindenyl)zirconium dichloride, isopropylidene(cyclopentadienyl)(fluorenyl)

zirconium dichloride, dimethylsilylenebis(cyclopentadienyl)zirconium dichloride, dimethylsilylenebis(indenyl)zirconium dichloride, dimethylsilylenebis(2-methylindenyl)zirconium dichloride, dimethylsilylenebis(4,5,6,7-tetrahydroindenyl)zirconium dichloride, dimethylsilylenebis(cyclopentadienyl)(fluorenyl)zirconium dichloride, diphenylsilylenebis(indenyl)zirconium dichloride, (cyclopentadienyl)(dimethylamide)zirconium dichloride, (cyclopentadienyl)(phenoxy)zirconium dichloride, dimethylsilylene(tert-butylamide)(tetramethylcyclopentadienyl)zirconium dichloride, bis(cyclopentadienyl)zirconium dimethyl, bis(methylcyclopentadienyl)zirconium dimethyl, bis(pentamethylcyclopentadienyl)zirconium dimethyl, bis(indenyl)zirconium dimethyl, bis(4,5,6,7-tetrahydroindenyl)zirconium dimethyl, bis(fluorenyl)zirconium dimethyl, ethylenebis(indenyl)zirconium dimethyl, dimethylsilylene(tert-butylamide)(tetramethylcyclopentadienyl)zirconium dimethyl and the like.

There can also be exemplified compounds wherein zirconium is replaced with titanium or hafnium in the above zirconium compounds.

These metallocene transition metal compounds may be used alone or in combination thereof.

(C) Organoaluminum Compound

As the organoaluminum compound(C) used in the present invention, a publicly known organoaluminum compound can be used. Preferably, it is an organoaluminum compound represented by the general formula (4) $R^4_b AlY_{3-b}$ (wherein $R^4$ represents a hydrocarbon group having 1 to 8 carbon atoms; Al represents an aluminum atom; Y represents a hydrogen atom and/or halogen atom; and b represents a number satisfying $0<b\leq3$).

Specific examples of $R^4$ in the general formula (4) representing the organoaluminum compound include a methyl group, ethyl group, n-propyl group, n-butyl group, isobutyl group, n-hexyl group, 2-methylhexyl group, n-octyl group and the like. Among them, an ethyl group, n-butyl group, isobutyl group and n-hexyl group are preferred. Specific examples of the halogen atom as for Y include fluorine atom, chlorine atom, bromine atom and iodine atom, preferably a chlorine atom.

Specific examples of the organoaluminum compound represented by the general formula (4) $R^4_b AlY_{3-b}$ include trialkylaluminums such as trimethylaluminum, triethylaluminum, tri-n-propylaluminum, tri-n-butylaluminum, triisobutylaluminum, tri-n-hexylaluminum, tri-n-octylaluminum and the like; dialkylaluminum chlorides such as dimethylaluminum chloride, diethylaluminum chloride, di-n-propylaluminum chloride, di-n-butylaluminum chloride, diisobutylaluminum chloride, di-n-hexylaluminum chloride and the like; alkylaluminum dichlorides such as methylaluminum dichloride, ethylaluminum dichloride, n-propylaluminum dichloride, n-butylaluminum dichloride, isobutylaluminum dichloride, n-hexylaluminum dichloride and the like; dialkylaluminum hydride such as dimethylaluminum hydride, diethylaluminum hydride, di-n-propylaluminum hydride, di-n-butylaluminum hydride, diisobutylaluminum hydride, di-n-hexylaluminum hydride and the like. Among them, trialkylaluminums are preferred, and trimethylaluminum, triethylaluminum, tri-n-butylaluminum, triisobutylaluminum and tri-n-hexylaluminum are more preferred and triisobutylaluminum and tri-n-hexylaluminum are most preferred.

These organoaluminum compounds may be used alone or in combination thereof.

The catalyst for olefin polymerization of the present invention comprises modified particles (A) and a transition metal compound(B) and optionally an organometallic compound(C). The amount of the component(B) is normally from $1\times10^{-6}$ to $1\times10^{-3}$ mol, and preferably from $5\times10^{-6}$ to $5\times10^{-4}$ mol, per 1 g of the component(A). And, the amount of the organometallic compound as the component(C) is preferably from 0.01 to 10,000, more preferably from 0.1 to 5,000, and most preferably from 1 to 2,000 in terms of molar ratio of the metal atom of the organometallic compound as the compound(c) to the transition metal atom of the transition metal compound as the component(B), i.e. (C)/(B).

In the present invention, the component(A) and component(B) and optionally component(C) can be charged in a reactor in an arbitrary order at the time of polymerization. Alternatively, these arbitrary components in an arbitrary combination may be charged in the reactor after previously bringing into contact with each other.

As a monomer used in the polymerization in the present invention, any olefins and diolefins, having 2 to 20 carbon atoms, etc. can be used. Two or more olefins can also be used, simultaneously. The monomers are exemplified blow, but the present invention is not to the compounds described below. Specific examples of the olefin include α-olefins having 3 to 20 hydrocarbon atoms such as ethylene, propylene, butene-1, pentene-1, hexene-1, heptene-1, octene-1, nonene-1, decene1, 4-methyl-1-pentene and the like, and olefins such as vinylcyclohexane and the like. Diolefins include conjugated dienes and non-conjugated dienes, and specific examples of the compounds include 1,5-hexadiene, 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, norbornadiene, 5-methylene-2-norbornene, 1,5-cyclooctadiene, 5,8-endomethylenehexahydronaphthalene and the like as a non-conjugated diene, and 1,3-butadiene, isoprene, 1,3-hexadiene, 1,3-octadiene, 1,3-cyclooctadiene, 1,3-cyclohexadiene and the like as a conjugated diene.

As a combination of monomers constituting a copolymer, combinations of ethylene and α-olefins described above (for example, ethylene and propylene, ethylene and butene-1, ethylene and hexene-1) are preferable, and further, combinations of α-olefins (for example, propylene and butene-1 and the like) are also exemplified, but the present invention should not be limited to the above compounds.

In the present invention, an aromatic vinyl compound can also be used as the monomer. Specific examples of the aromatic vinyl compound include styrene, o-methylstyrene, m-methylstyrene, p-methylstyrene, divinylbenzene and the like.

The polymerization method is not particularly limited, and there can be used gas phase polymerization in a gaseous monomer, solution polymerization using a solvent, slurry polymerization or the like. Examples of the solvent used in the solution polymerization or slurry polymerization include aliphatic hydrocarbon solvents such as butane, pentane, heptane, octane and the like; aromatic hydrocarbon solvents such as benzene, toluene and the like; halogenated hydrocarbon solvents such as methylene chloride and the like. It is also possible to use the olefin itself as the solvent. The polymerization method may be batch-wise polymerization or continuous polymerization and, furthermore, the polymerization may be performed in two or more stages under different reaction conditions, respectively. The polymerization time is appropriately determined according to the kind of the desired olefin polymer and reaction apparatus, but can be within the range from 1 minute to 20 hours.

The present invention can be applied to the polymerization accompanying formation of polymer particles (e.g. slurry polymerization, gas phase polymerization, etc.), particularly preferably.

The slurry polymerization may be performed according to a publicly known slurry polymerization method and polymerization conditions.

According to the preferred polymerization method in the slurry method, there is used a continuous type reactor wherein a monomer (comonomer), a feed and a diluent are optionally added and a polymer product is taken out, continuously or periodically. As the reactor, there is used a loop reactor or a plurality of stirring reactors, having different reactors or reaction conditions, connected in series or parallel or a combination thereof As the diluent, there can be used an inert diluent (medium) such as a paraffin, cycloparaffin or aromatic hydrocarbon. The temperature of the polymerization reactor or reaction zone is normally within the range from about 50 to about 100° C., and preferably from 60 to 80° C. The pressure can normally vary within the range from about 0.1 to about 10 MPa, and preferably from 0.5 to 5 MPa. There can be set to the pressure at which a catalyst can be maintained in the suspended state and a medium and at least a part of a monomer and a comonomer can be maintained in the sate of a liquid phase and, furthermore, the monomer and comonomer can be contacted therewith. Accordingly, the medium, temperature and pressure may be selected so that the olefin polymer is formed as solid particles and is recovered in that form.

The molecular weight of the olefin polymer can be controlled by publicly known means such as control of the temperature of the reaction zone, introduction of hydrogen or the like.

The respective catalyst components and monomer (and comonomer) can be added to the reactor or reaction zone by a publicly known arbitrary method in arbitrary order. For example, there can be used a method of adding the respective catalyst components and monomer (and comonomer) to the reaction zone, simultaneously or successively. If desired, the respective catalyst components can be previously contacted with each other in an inert atmosphere prior to contact with the monomer (and comonomer).

The gas phase polymerization may be performed according to a publicly known gas phase polymerization method and polymerization conditions, but is not limited thereto. As the gas phase polymerization apparatus, there can be used a fluidized bed type reactor, preferably a fluidized bed type reactor having an extended portion. A reaction apparatus equipped with a stirring blade in a reactor may also be used with no problem.

As the method of feeding the respective components to the polymerization reactor, there can be used a method of feeding them in the absence of water using an inert gas (e.g. nitrogen, argon), hydrogen, ethylene or the like, or a method of feeding them in the form of a solution or slurry dissolved or diluted in a solvent. The respective catalyst components may be separately fed, or fed after previously contacting the arbitrary components with each other in an arbitrary order.

Regarding the polymerization conditions, the temperature is lower than the temperature at which the polymer is molten, preferably from 20 to 100° C., and particularly preferably from 40 to 90° C. The pressure is preferably within the range from 0.1 to 5 MPa, and more preferably from 0.3 to 4 MPa. Furthermore, hydrogen may also be added as a molecular weight modifier for the purpose of controlling the melt fluidity of the final product. In case of the polymerization, an inert gas may coexist in a mixed gas.

BEST MODE FOR PRACTICING THE INVENTION

Figure 1:
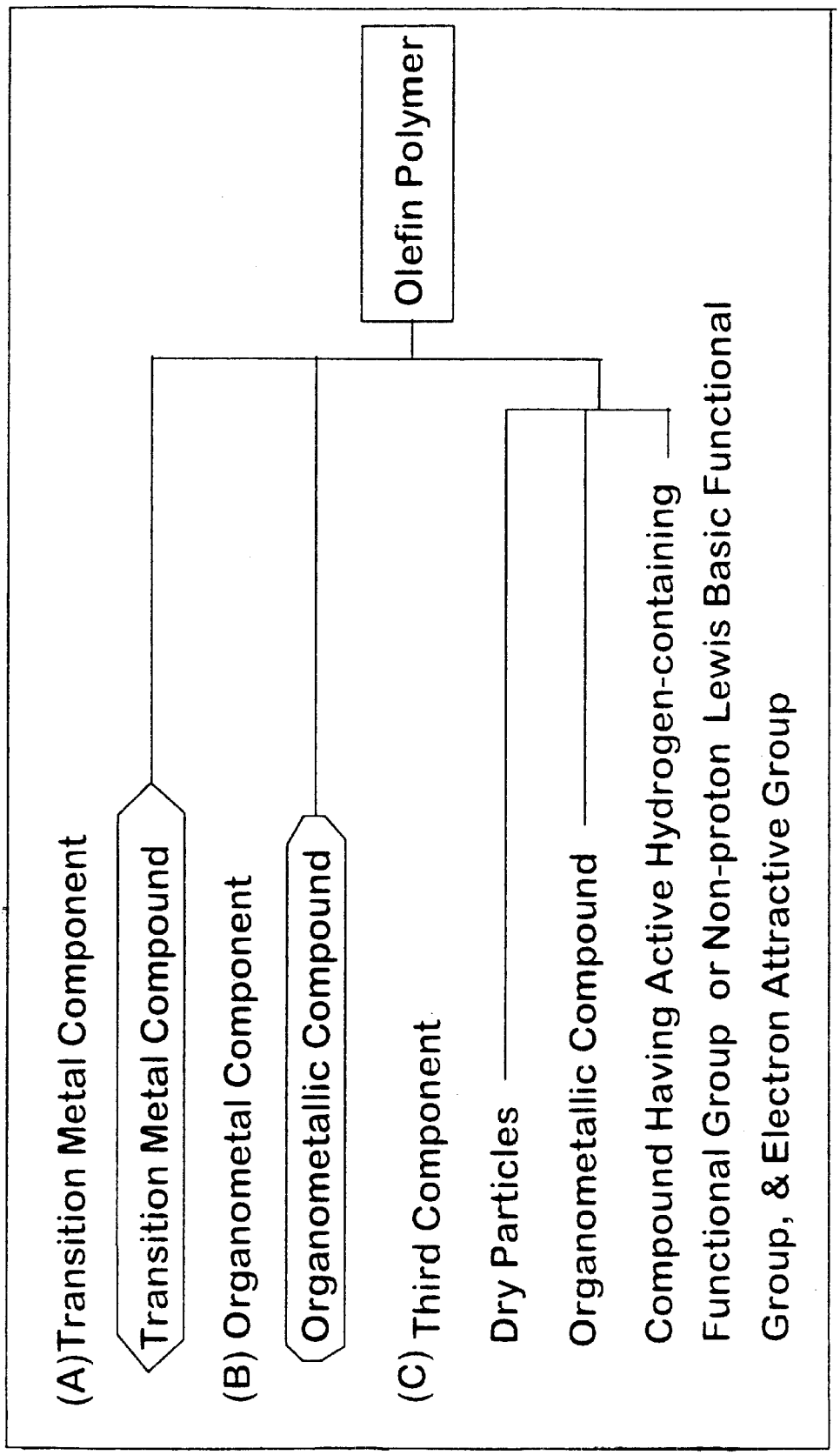
FIG. 1 is a flow chart for assisting the understanding of the present invention. This flow chart is a typical example of an embodiment of the present invention, and the present invention is not limited thereto.

The present invention is explained by Examples and Comparative Examples in more detail below but is not limited thereto. Properties of olefin polymers in the Examples were measured by the following methods.

(1) Content of α-olefin in Copolymer

The content of an α-olefin in the obtained copolymer was determined from its infrared absorption spectrum. The measurement and calculation were carried out according to the method described in the literature (Characterization of Polyethylene by Infrared Absorption Spectrum, authored by Takayama and Usami et al.; or Die Makromoleculare Chemie, 177, 461(1976) McRae, M. A., Madams, W. F.) utilizing characteristic absorption derived from α-olefin, e.g. $1375\ cm^{-1}$ (propylene) and $772\ cm^{-1}$. The infrared absorption spectrum was measured by using an infrared spectrometer (FT-IR7300, manufactured by Nippon Bunko Kogyo Co.). The short chain branch (SCB) was represented as a short chain branch number per 1000 carbon atoms.

(2) Melting Point of Copolymer

It was measured under the following conditions by using Seiko SSC-5200.

Heating: heating from 40 to 150° C. (10° C./min.) and maintaining for 5 minutes

Cooling: cooling from 150 to 40° C. (5° C./min.) and maintaining for 10 minutes

Measurement: measured at the temperature within the range from 40 to 160° C. (5° C./min.)

(3) Intrinsic Viscosity [η]

100 mg of the obtained copolymer was dissolved in 50 ml of tetralin at 135° C., and then the intrinsic viscosity was determined from a dropping rate of a tetralin solution obtained by dissolving said sample by using an Ubbelohde viscometer set in an oil bath maintained at 135° C.

(4) Molecular Weight and Molecular Weight Distribution

They were determined under the following conditions by using gel permeation chromatograph (150, C, manufactured by Waters Co.). The molecular weight distribution (Mw/Mn) was represented as a ratio of the weight average molecular weight(Mw) to the number average molecular weight(Mn).

Column: TSK gel GMH-HT

Measuring temperature: set at 145° C.

Measuring concentration: 10 mg/10 ml ortho-dichlorobenzene (5) MFR

It was measured at 190° C. according to the method defined in JIS K6760.

(6) Density

It was determined according to JIS K-6760. The value of density (without annealing) is a value of density measured without annealing, and the value of density (with annealing) is a value of density measured after annealing treatment. Unit:$g/cM^3$.

EXAMPLE 1

(1) Contact Treatment of Particles (a) with Organometallic Compound(b)

The atmosphere in a 200 ml four necked flask equipped with a stirrer, a dropping funnel and a thermometer was dried under reduced pressure and then replaced with nitrogen. 5.51 g of silica (manufactured by CROSFIELD Co., Ltd., ES70X, average diameter: 48.0 μm, pore volume: 1.61 ml/g, specific surface area: 290 $m^2/g$) heat-treated under a nitrogen flow at 300° C. for 5 hours was charged in the flask. Then, 100 ml of toluene was added to form a slurry, the slurry was cooled to 5° C. in an ice bath and 11.0 ml of a toluene solution of trimethylaluminum whose concentration was adjusted to 1 mmol/ml was slowly added dropwise thereto. In that case, a gas was evolved. After stirring at 5° C. for 30 minutes, then at 80° C. for 2 hours, the supernatant was removed by filtration and the residual solid compound was washed four times with 100 ml of toluene and then washed twice with 100 ml of hexane. Thereafter, the solid compound was dried under reduced pressure to obtain 5.54 g of a flowable solid compound.

(2) Compound (c) Treatment

The atmosphere in a 100 ml four neck flask equipped with a stirrer and a thermometer was dried under reduced pressure and then replaced by nitrogen. 1.05 g of the solid compound obtained in the (1) described above was charged in the flask. Then, 50 ml of toluene was added to form a slurry and 2.1 ml of a toluene solution of pentafluorophenol whose concentration was adjusted to 1 mmol/ml was slowly added. In that case, a gas was evolved. After stirring at room temperature for 30 minutes, then at 80° C. for 2 hours, the supernatant was removed by filtration and the residual solid compound was washed four times with 50 ml of toluene and then washed twice with 50 ml of hexane. Thereafter, the solid compound was dried under reduced pressure to obtain 1.13 g of a flowable solid compound.

(3) Ethylene Polymerization

An autoclave (internal volume of 400 ml) equipped with a stirrer, wherein the atmosphere was dried under reduced pressure and then replaced with argon, was evacuated and 95 g of butane and 5 g of butene-1 were charged in the autoclave, followed by heating to 70° C. Ethylene was added so that its partial pressure became 6 kg/cm$^2$ and, after the system became stable, 0.25 ml of a heptane solution of triisobutylaluminum whose concentration was adjusted to 1 mmol/ml was charged. Then, 0.5 ml of a toluene solution of ethylenebis(indenyl)zirconium dichloride whose concentration was adjusted to 2 μmol/ml was charged and 35.7 mg of the solid compound obtained in the (2) described above was charged as the solid catalyst component. The polymerization was carried out at 70° C. for 30 minutes while feeding ethylene so that the total pressured is held constant. As a result, 38.4 g of an olefin polymer was obtained. The polymerization activity per transition metal atom was 7.7× 10$^7$ g/mol Zr. hour and the polymerization activity per solid catalyst component was 2150 g/g hour. The resulting olefin polymer has SCB of 21.1, a melting point of 110.3° C. and 119.6° C. and [η] of 1.87.

Comparative Example 1

(1) Contact Treatment Between Dry Particles and Organometallic Compound

The atmosphere in a 200 ml four neck flask equipped with a stirrer, a dropping funnel and a thermometer was dried under reduced pressure and then replaced with nitrogen. 9.26 g of silica (manufactured by CROSFIELD Co., Ltd., ES70X) heat-treated under a nitrogen flow at 300° C. for 5 hours was charged in the flask. Then, 92.6 ml of toluene was added to form a slurry,. which was cooled to 5° C. in an ice bath and 18.5 ml of a toluene solution of trimethylaluminum whose concentration was adjusted to 1 mmol/ml was slowly added dropwise. In that case, a gas was evolved. After stirring at 5° C. for 30 minutes, then at room temperature for 2 hours, the supernatant was removed by filtration and the residual solid compound was washed four times with 100 ml of toluene and then washed twice with 100 ml of hexane. Thereafter, the solid compound was dried under reduced pressure to obtain 9.92 g of a flowable solid compound.

(2) Ethylene Polymerization

An autoclave (internal volume of 400 ml) equipped with a stirrer, wherein the atmosphere was dried under reduced pressure and then replaced with argon, was evacuated and 95 g of butane and 5 g of butene-1 were charged in the autoclave, followed by heating to 70° C. Ethylene was added so that its partial pressure became 6 kg/cm$^2$ and, after the system was stabilized, 0.25 ml of a heptane solution of triisobutylaluminum whose concentration was adjusted to 1 mmol/ml was charged. Then, 1.0 ml of a toluene solution of ethylenebis(indenyl)zirconium dichloride whose concentration was adjusted to 1 μmol/ml was charged and 30.0 mg of the solid compound obtained in the above item (1) was charged as the solid catalyst component. The polymerization was carried out at 70° C. for 30 minutes while feeding ethylene so that the total pressured is held constant. As a result, an olefin polymer was not obtained.

Comparative Example 2

(1) Contact Treatment Between Undried Particles and Organometallic Compound

The atmosphere in a 100 ml four neck flask equipped with a stirrer, a dropping funnel and a thermometer was dried under reduced pressure and then replaced with nitrogen. 2.00 g of non-heat-treated silica (manufactured by CROSFIELD Co., Ltd., ES70X) was charged in the flask. Then, 50 ml of toluene was added to form a slurry, which was cooled to 5° C. in an ice bath and 8.0 ml of a toluene solution of trimethylaluminum whose concentration was adjusted to 1 mmol/ml was slowly added dropwise. In that case, a gas was evolved. After stirring at 5° C. for 30 minutes, then at room temperature for 2 hours, the supernatant was removed by filtration and the residual solid compound was washed four times with 150 ml of toluene and then washed twice with 50 ml of hexane. Thereafter, the solid compound was dried under reduced pressure to obtain 2.31 g of a flowable solid compound.

(2) Ethylene Polymerization

An autoclave (internal volume of 400 ml) equipped with a stirrer, wherein the atmosphere was dried under reduced pressure and then replaced with argon, was evacuated and 95 g of butane and 5 g of butene-1 were charged in the autoclave, followed by heating to 70° C. Ethylene was added so that its partial pressure became 6 kg/cm$^2$ and, after the system was stabilized, 0.25 ml of a heptane solution of triisobutylaluminum whose concentration was adjusted to 1 mmol/ml was charged. Then, 0.5 ml of a toluene solution of ethylenebis(indenyl)zirconium dichloride whose concentration was adjusted to 2 μmol/ml was charged and 29.2 mg of the solid compound obtained in the (1) described above was charged as the solid catalyst component. The polymerization was carried out at 70° C. for 30 minutes while feeding ethylene so that the total pressured is held constant. As a result, 0.118 g of an olefin polymer was obtained. The polymerization activity per transition metal atom was 3.8× 10$^5$ g/mol Zr. hour and the polymerization activity per solid catalyst component was 12.9 g/g hour.

It is considered that, regarding the solid compound obtained in the (1) above, methylaluminoxane was produced by reacting water remained in silica with trimethylaluminum (additional test of Japanese Patent Kokai(Unexamined) No. 1-207303). Unlike Comparative Example 1 using dried silica, the polymerization activity was shown but was lower than that of Example 1.

Comparative Example 3

(1) Synthesis of Aluminum Compound Having Electron Attractive Group

A 100 ml four neck flask equipped with a stirrer, a dropping funnel and a thermometer was dried under reduced pressure and then replaced with nitrogen. 30 ml of toluene and 20 ml of a toluene solution of trimethylaluminum whose concentration was adjusted to 1 mmol/ml were added in the flask. After cooling to not more than 5° C. in an ice bath, 20 ml of a toluene solution of pentafluorophenol whose concentration was adjusted to 2 mmol/ml was added dropwise. After completion of the dropwise addition, the solution was stirred at 5° C. for 30 minutes, then at room temperature for 5 hours. After the solvent was distilled off until the amount of the solution was reduced to half, the solution was concentrated, cooled and then re-crystallized. As a result, 2.70 g of $MeAl(OC_6F_5)_2$ was obtained as a white crystal. The yield was 34.4%.

(2) Contact Treatment Between Dried Particles and Organometallic Compound Having Electron Attractive Group A 100 ml four neck flask equipped with a stirrer, a dropping funnel and a thermometer was dried under reduced pressure and then replaced with nitrogen. 1.16 g of silica (manufactured by CROSFIELD Co., Ltd., ES70X) heat-treated under a nitrogen flow at 300° C. for 5 hours was charged in the flask. Then, 50 ml of toluene was added to form a slurry, and 2.0 ml of a toluene solution of MeAl $(OC_6F_5)_2$ (2 mmol/ml synthesized in the (1) described above was slowly added dropwise. In that case, a gas was evolved. After stirring at room temperature for 30 minutes, then at 8° C. for 2 hours, the supernatant was removed by filtration and the residual solid compound was washed four times with 50 ml of toluene and then washed twice with 50 ml of hexane. Thereafter, the solid compound was dried under reduced pressure to obtain 1.39 g of a flowable solid compound.

(3) Ethylene Polymerization

An autoclave (internal volume of 400 ml) equipped with a stirrer, wherein the atmosphere was dried under reduced pressure and then replaced with argon, was evacuated and 95 g of butane and 5 g of butene-1 were charged in the autoclave, followed by heating to 70° C. Ethylene was added so that its partial pressure became 6 kg/cm$^2$ and, after the system was stabilized, 0.25 ml of a heptane solution of triisobutylaluminum whose concentration was adjusted to 1 mmol/ml was charged. Then, 1.0 ml of a toluene solution of ethylenebis(indenyl)zirconium dichloride whose concentration was adjusted to 1 $\mu$mol /ml was charged and 36.2 mg of the solid compound obtained in the (2) above was charged as the solid catalyst component. The polymerization was carried out at 70° C. for 30 minutes while feeding ethylene so that the total pressured is held constant. As a result, 32.2 g of an olefin polymer was obtained. The polymerization activity per transition metal atom was $6.4 \times 10^7$ g/mol Zr. hour and the polymerization activity per solid catalyst component was 1780 g/g hour. The resulting olefin polymer has SCB of 20.1, a melting point of 111.7° C. and 117.4° C. and [η] of 1.82.

EXAMPLE 2

(1) Contact Treatment Between Particles (a) and Organometallic Compound (b)

A 500 ml four neck flask equipped with a stirrer, a dropping funnel and a thermometer was dried under reduced pressure and then replaced with nitrogen. 45.0 g of silica (manufactured by CROSFIELD Co., Ltd., ES70X) heat-treated under a nitrogen flow at 300° C. for 5 hours was charged in the flask. Then, 250 ml of toluene was added to form a slurry, which was cooled to 5° C. in an ice bath and 90.0 ml of a toluene solution of trimethylaluminum whose concentration was adjusted to 1 mmol/ml was slowly added dropwise. In that case, a gas was evolved. After stirring at 5° C. for 30 minutes, then at 80° C. for 2 hours, the supernatant was removed by filtration and the residual solid compound was washed four times with 250 ml of toluene and then washed twice with 250 ml of hexane. Thereafter, the solid compound was dried under reduced pressure to obtain 46.0 g of a flowable solid compound.

(2) Compound (c) Treatment

A 500 ml four neck flask equipped with a stirrer and a thermometer was dried under reduced pressure and then replaced with nitrogen. 37.2 g of the solid compound obtained in the (1) described above was charged in the flask. Then, 222 ml of toluene was added to form a slurry and 37.2 ml of a toluene solution of pentafluorophenol whose concentration was adjusted to 2 mmol/ml was slowly added dropwise. In that case, a gas was evolved. After stirring at room temperature for 30 minutes, then at 80° C. for 2 hours, the supernatant was removed by filtration and the residual solid compound was washed four times with 200 ml of toluene and then washed twice with 200 ml of hexane. Thereafter, the solid compound was dried under reduced pressure to obtain 45.2 g of a flowable solid compound.

(3) Ethylene Polymerization

An autoclave (internal volume of 400 ml) equipped with a stirrer was dried under reduced pressure, then replaced with argon and evacuated, and 95 g of butane and 5 g of butene-1 were charged in the autoclave, followed by heating to 70° C. Ethylene was added so that its partial pressure became 6 kg/cm$^2$ and, after the system was stabilized, 0.25 ml of a heptane solution of triisobutylaluminum whose concentration was adjusted to 1 mmol/ml was charged. Then, 0.2 ml of a toluene solution of ethylenebis(indenyl) zirconium dichloride whose concentration was adjusted to 1 $\mu$mol/ml was charged and 12.2 mg of the solid compound obtained in the (2) described above was charged as the solid catalyst component. The polymerization was carried out at 70° C. for 30 minutes while feeding ethylene so that the total pressured is held constant. As a result, 24.0 g of an olefin polymer was obtained. The polymerization activity per transition metal atom was $2.4 \times 10^8$ g/mol zr. hour and the polymerization activity per solid catalyst component was 3980 g/g hour. The resulting olefin polymer has SCB of 17.3, a melting point of 103.1° C. and [η] of 2.18.

EXAMPLE 3

(1) Contact Treatment Between Particles (a) and Organometallic Compound (b)

A 200 ml four neck flask equipped with a stirrer, a dropping funnel and a thermometer was dried under reduced pressure and then replaced with nitrogen. 10.7 g of silica (manufactured by CROSFIELD Co., Ltd., ES70X) heat-treated under a nitrogen flow at 300° C. for 5 hours was charged in the flask. Then, 110 ml of toluene was added to form a slurry, which was cooled to 5° C. in an ice bath and 21.4 ml of a toluene solution of triethylaluminum whose concentration was adjusted to 1 mmol/ml was slowly added dropwise. In that case, a gas was evolved. After stirring at 5° C. for 30 minutes, then at room temperature for 2 hours, the supernatant was removed by filtration and the residual solid compound was washed four times with 100 ml of toluene and then washed twice with 100 ml of hexane. Thereafter, the solid compound was dried under reduced pressure to obtain 11.1 g of a flowable solid compound.

(2) Compound (c) Treatment

A 100 ml four neck flask equipped with a stirrer and a thermometer was dried under reduced pressure and then replaced with nitrogen. 1.83 g of the solid compound obtained in the (1) described above was charged in the flask. Then, 50 ml of toluene was added to form a slurry and 3.6 ml of a toluene solution of pentafluorophenol whose concentration was adjusted to 1 mmol/ml was slowly added. In that case, a gas was evolved. After stirring at room temperature for 30 minutes, then at 80° C. for 2 hours, the supernatant was removed by filtration and the residual solid compound was washed four times with 50 ml of toluene and then washed twice with 50 ml of hexane. Thereafter, the solid compound was dried under reduced pressure to obtain 1.93 g of a flowable solid compound.

(3) Ethylene Polymerization

An autoclave (internal volume of 400 ml) equipped with a stirrer, wherein the atmosphere was dried under reduced pressure and then replaced with argon, was evacuated and 95 g of butane and 5 g of butene-1 were charged in the autoclave, followed by heating to 70° C. Ethylene was added so that its partial pressure became 6 kg/cm$^2$ and, after the system was stabilized, 0.25 ml of a heptane solution of triisobutylaluminum whose concentration was adjusted to 1 mmol/ml was charged. Then, 0.5 ml of a toluene solution of ethylenebis(indenyl)zirconium dichloride whose concentration was adjusted to 2 $\mu$mol/ml was charged and 43.4 mg of the solid compound obtained in the (2) described above was charged as the solid catalyst component. The polymerization was carried out at 70° C. for 10 minutes while feeding ethylene so that the total pressured is held constant. As a result, 20.6 g of an olefin polymer was obtained. The polymerization activity per transition metal atom was 1.2×10$^8$ g/mol Zr. hour and the polymerization activity per solid catalyst component was 2850 g/g hour. The resulting olefin polymer has SCB of 29.9, a melting point of 87.0° C. and 98.5° C., and [η] of 1.24.

EXAMPLE 4

(1) Contact Treatment Between Particles (a) and Organometallic Compound (b)

A 200 ml four neck flask equipped with a stirrer, a dropping funnel and a thermometer was dried under reduced pressure and then replaced with nitrogen. 13.8 g of silica (manufactured by CROSFIELD Co., Ltd., ES70X) heat-treated under a nitrogen flow at 300° C. for 5 hours was charged in the flask. Then, 138 ml of toluene was added to form a slurry, which was cooled to 5° C. in an ice bath and 27.5 ml of a toluene solution of trimethylaluminum whose concentration was adjusted to 1 mmol/ml was slowly added dropwise. In that case, a gas was evolved. After stirring at 5° C. for 30 minutes, then at room temperature for 2 hours, the supernatant was removed by filtration and the residual solid compound was washed four times with 100 ml of toluene and then washed twice with 100 ml of hexane. Thereafter, the solid compound was dried under reduced pressure to obtain 13.8 g of a flowable solid compound.

(2) Compound (c) Treatment

A 100 ml four neck flask equipped with a stirrer and a thermometer was dried under reduced pressure and then replaced with nitrogen. 2.10 g of the solid compound obtained in the (1) described above was charged in the flask. Then, 50 ml of toluene was added to form a slurry and 4.2 ml of a toluene solution of pentafluorophenol whose concentration was adjusted to 1 mmol/ml was slowly added. In that case, a gas was evolved. After stirring at room temperature for 30 minutes, then at 80° C. for 2 hours, the supernatant was removed by filtration and the residual solid compound was washed four times with 50 ml of toluene and then washed twice with 50 ml of hexane. After washing, the solid compound was dried under reduced pressure to obtain 2.28 g of a flowable solid compound.

(3) Ethylene Polymerization

An autoclave (internal volume of 400 ml) equipped with a stirrer, wherein the atmosphere was dried under reduced pressure and then replaced by argon, was evacuated and 95 g of butane and 5 g of butene-1 were charged in the autoclave, followed by heating to 70° C. Ethylene was added so that its partial pressure became 6 kg/cm$^2$ and, after the system was stabilized, 0.25 ml of a heptane solution of tri-n-hexylaluminum whose concentration was adjusted to 1 mmol/ml was charged. Then, 0.5 ml of a toluene solution of ethylenebis(indenyl)zirconium dichloride whose concentration was adjusted to 2 $\mu$mol/ml was charged and 26.7 mg of the solid compound obtained in the (2) described above was charged as the solid catalyst component. The polymerization was carried out at 70° C. for 30 minutes while feeding ethylene so that the total pressured is held constant. As a result, 23.5 g of an olefin polymer was obtained. Polymerization activity per transition metal atom was 4.7×10$^7$ g/mol Zr. hour and polymerization activity per solid catalyst component was 1760 g/g hour. The resulting olefin polymer has SCB of 17.1, a melting point of 106.3° C. and [η] of 1.80.

EXAMPLE 5

(1) Preparation of Particles (A)

A 50 ml four neck flask equipped with a stirrer, a dropping funnel and a thermometer was dried under reduced pressure and then replaced with nitrogen. 1.89 g of silica (manufactured by CROSFIELD Co., Ltd., ES70X) heat-treated under a nitrogen flow at 300° C. for 5 hours was charged in the flask. Then, 10 ml of toluene was added to form a slurry, which was cooled to 5° C. in an ice bath and 3.8 ml of a toluene solution of trimethylaluminum whose concentration was adjusted to 1 mmol/ml was slowly added dropwise. In that case, a gas was evolved. After stirring at 5° C. for 30 minutes, then at 80° C. for 2 hours, the supernatant was removed by filtration and the residual solid compound was washed four times with 10 ml of toluene. Then, 10 ml of toluene was added to form a slurry again and 3.8 ml of a toluene solution of pentafluorophenol whose concentration was adjusted to 1 mmol/ml was slowly added. Also in this case, a gas was evolved. After stirring at room temperature for 30 minutes, then at 80° C. for 2 hours, the supernatant was removed by filtration and the residual solid compound was washed four times with 10 ml of toluene and then washed twice with 10 ml of hexane. After washing, the solid compound was dried under reduced pressure to obtain 2.35 g of a flowable solid compound.

(2) Ethylene Polymerization

An autoclave (internal volume of 3 liter) equipped with a stirrer, wherein the atmosphere was dried under reduced pressure and then replaced with argon, was evacuated and 720 g of butane and 30 g of butene-1 were charged in the autoclave, followed by heating to 70° C. Ethylene was added so that its partial pressure became 6 kg/cm$^2$ and, after the system was stabilized, 1.8 ml of a heptane solution of triisobutylaluminum whose concentration was adjusted to 1 mmol/ml was charged. Then, 0.5 ml of a toluene solution of ethylenebis(indenyl)zirconium dichloride whose concentration was adjusted to 1 $\mu$mol/ml was charged and 24.8 mg of the solid compound obtained in the (1) described above was charged as the solid catalyst component. The polymerization was carried out at 70° C. for 60 minutes while feeding ethylene so that the total pressured is held constant. As a result, 75 g of an olefin polymer was obtained. The polymerization activity per transition metal atom was 1.5×10$^8$ g/mol Zr. hour and the polymerization activity per solid catalyst component was 3030 g/g hour. The resulting olefin polymer has SCB of 22.4, a melting point of 98.8° C., [η] of 2.23.

EXAMPLE 6
(1) Ethylene Polymerization

An autoclave (internal volume of 3 liter) equipped with a stirrer, wherein the atmosphere was dried under reduced pressure and then replaced with argon, was evacuated and 720 g of butane and 30 g of butene-1 were charged in the autoclave, followed by heating to 83° C. Ethylene was added so that its partial pressure became 6 kg/cm$^2$ and, after the system was stabilized, 1.8 ml of a heptane solution of triisobutylaluminum whose concentration was adjusted to 1 mmol/ml was charged. Then, 0.5 ml of a toluene solution of ethylenebis(indenyl)zirconium dichloride whose concentration was adjusted to 1 μmol/ml was charged and 22.3 mg of the solid compound obtained in the (1) described above was charged as the solid catalyst component. The polymerization was carried out at 83° C. for 60 minutes while feeding ethylene so that the total pressured is held constant. As a result, 41 g of an olefin polymer was obtained. The polymerization activity per transition metal atom was 8.2×10$^7$ g/mol Zr. hour and the polymerization activity per solid catalyst component was 1840 g/g hour. The resulting olefin polymer has SCB of 26.5, a melting point of 101.3° C., [η] of 2.23 and MFR of 0.303 g/10 mim.

EXAMPLE 7
(1) Ethylene Polymerization

An autoclave (internal volume of 3 liter) equipped with a stirrer, wherein the atmosphere was dried under reduced pressure and then replaced with argon, was evacuated and 720 of butane and 30 g of butene-1 were charged in the autoclave, followed by heating to 70° C. Ethylene was added so that its partial pressure became 6 kg/cm$^2$ and hydrogen was added so that its partial pressure became 50 mmHg and, after the system was stabilized, 1.8 ml of a heptane solution of triisobutylaluminum whose concentration was adjusted to 1 mmol/ml was charged. Then, 0.5 ml of a toluene solution of ethylenebis(indenyl)zirconium dichloride whose concentration was adjusted to 1 μmol/ml was charged and 27.5 mg of the solid compound obtained in Example 2(2) was charged as the solid catalyst component. The polymerization was carried out at 70° C. for 60 minutes while feeding ethylene so that the total pressured is held constant. As a result, 28 g of an olefin polymer was obtained. The polymerization activity per transition metal atom was 5.6×10$^7$ g/mol Zr. hour and the polymerization activity per solid catalyst component was 1020 g/g hour. The resulting olefin polymer has SCB of 26.4, melting points of 91.7° C. and 99.9° C., [η] of 1.31, Mw of 83200, Mn of 25600, Mw/Mn of 3.3 and MFR of 1.98 g/10 min.

EXAMPLE 8
(1) Preparation of Particles (A)

A 100 ml four neck flask equipped with a stirrer, a dropping funnel and a thermometer was dried under reduced pressure and then replaced with nitrogen. 1.09 g of the solid compound obtained in Example 4(1) was charged in the flask. Then, 50 ml of toluene was added to form a slurry, and 0.31 ml of perfluoro-tert-butylacohol was slowly added. In that case, a gas was evolved. After stirring at room temperature for 30 minutes, then at 80° C. for 2 hours, the supernatant was removed by filtration and the residual solid compound was washed four times with 50 ml of toluene and then washed twice 50 ml of hexane. After washing, the solid compound was dried under reduced pressure to obtain 1.20 g of a flowable solid compound.

(2) Ethylene Polymerization

An autoclave (internal volume of 3 liter) equipped with a stirrer, wherein the atmosphere was dried under reduced pressure and then replaced by argon, was evacuated and 715 g of butane and 35 g of butene-1 were charged in the autoclave, followed by heating to 70° C. Ethylene was added so that its partial pressure became 6 kg/cm$^2$ and, after the system was stabilized, 1.8 ml of a heptane solution of triisobutylaluminum whose concentration was adjusted to 1 mmol/ml was charged. Then, 1.0 ml of a toluene solution of ethylenebis(indenyl)zirconium dichloride whose concentration was adjusted to 1 μmol/ml was charged and 37.6 mg of the solid compound obtained in the (1) described above was charged as the solid catalyst component. The polymerization was carried out at 70° C. for 60 minutes while feeding ethylene so that the total pressured is held constant. As a result, 124 g of an olefin polymer was obtained. The polymerization activity per transition metal atom was 1.2× 10$^8$ g/mol zr. hour and the polymerization activity per solid catalyst component was 3300 g/g hour. The resulting olefin polymer has SCB of 19.2, a melting point of 103.5° C. and [η] of 2.39.

EXAMPLE 9
(1) Ethylene Polymerization

An autoclave (internal volume of 3 liter) equipped with a stirrer, wherein the atmosphere was dried under reduced pressure and then replaced with argon, was evacuated and 715 g of butane and 35 g of butene-1 were charged in the autoclave, followed by heating to 70° C. Ethylene was added so that its partial pressure became 6 kg/cm$^2$ and hydrogen was added so that its partial pressure became 100 mmHg and, after the system was stabilized, 1.8 ml of a heptane solution of triisobutylaluminum whose concentration was adjusted to 1 mmol/ml was charged. Then, 1.0 ml of a toluene solution of ethylenebis(indenyl)zirconium dichloride whose concentration was adjusted to 1 g mol/ml was charged and 55.3 mg of the solid compound obtained in the above item (1) of Example 8 was charged as the solid catalyst component. The polymerization was carried out at 70° C. for 60 minutes while feeding ethylene so that the total pressured is held constant. As a result, 21 g of an olefin polymer was obtained. The polymerization activity per transition metal atom was 2.1×10$^6$ g/mol Zr. hour and the polymerization activity per solid catalyst component was 380 g/g hour. The resulting olefin polymer has SCB of 30.8, a melting point of 96.3° C., [η] of 1.20 and MFR of 0.89 g/10 min.

EXAMPLE 10
(1) Contact Treatment Between Particles (a) and Organometallic Compound (b)

A 200 ml four neck flask equipped with a stirrer, a dropping funnel and a thermometer was dried under reduced pressure and then replaced with nitrogen. 9.25 g of silica (manufactured by CROSFIELD Co., Ltd., ES70X) heat-treated under a nitrogen flow at 300° C. for 5 hours was charged in the flask. Then, 92.5 ml of toluene was added to form a slurry, which was cooled to 5° C. in an ice bath and 18.5 ml of a toluene solution of trimethylaluminum whose concentration was adjusted to 1 mmol/ml was slowly added dropwise. In that case, a gas was evolved. After stirring at 5° C. for 30 minutes, then at room temperature for 2 hours, the supernatant was removed by filtration and the residual solid compound was washed four times with 100 ml of toluene and then washed twice with 100 ml of hexane. Thereafter, the solid compound was dried under reduced pressure to obtain 9.96 g of a flowable solid compound.

(2) Compound (c) Treatment

A 100 ml four neck flask equipped with a stirrer and a thermometer was dried under reduced pressure and then replaced with nitrogen. 0.76 g of the solid compound obtained in the (1) described above was charged in the flask. Then, 50 ml of toluene was added to form a slurry and 1.5 ml of a toluene solution of 2,3,5,6-tetrafluorophenol whose concentration was adjusted to 1 mmol/ml was slowly added. In that case, a gas was evolved. After stirring at room temperature for 30 minutes, then at 80° C. for 2 hours, the supernatant was removed by filtration and the residual solid compound was washed four times with 50 ml of toluene and then washed twice with 50 ml of hexane. Thereafter, the solid compound was dried under reduced pressure to obtain 0.78 g of a flowable solid compound.

(3) Ethylene Polymerization

An autoclave (internal volume of 400 ml) equipped with a stirrer, wherein the atmosphere was dried under reduced pressure and then replaced by argon, was evacuated and 95 g of butane and 5 g of butene-1 were charged in the autoclave, followed by heating to 70° C. Ethylene was added so that its partial pressure became 6 kg/cm$^2$ and, after the system was stabilized, 0.25 ml of a heptane solution of triisobutylaluminum whose concentration was adjusted to 1 mmol/ml was charged. Then, 1.0 ml of a toluene solution of ethylenebis(indenyl)zirconium dichloride whose concentration was adjusted to 1 $\mu$mol/ml was charged and 38.5 g of the solid compound obtained in the (2)described above was charged as the solid catalyst component. The polymerization was carried out at 70° C. for 30 minutes while feeding ethylene so that the total pressured is held constant. As a result, 16.1 g of an olefin polymer was obtained. The Polymerization activity per transition metal atom was 3.2× 10$^7$ g/mol Zr. hour and the polymerization activity per solid catalyst component was 836 g/g hour. The resulting olefin polymer has SCB of 17.7, a melting point of 103.1° C. and 109.5° C. and [η] of 1.84.

EXAMPLE 11

(1) Preparation of Particles (A)

The atmosphere in a 100 ml four neck flask equipped with a stirrer, a dropping funnel and a thermometer was dried under reduced pressure and then replaced by nitrogen. 0.83 g of the solid compound obtained in Example 10(1) was charged in the flask. Then, 50 ml of toluene was added to form a slurry, and 1.70 ml of 4-fluorophenol was slowly added. In that case, a gas was evolved. After stirring at room temperature for 30 minutes, then at 80° C. for 2 hours, the supernatant was removed by filtration and the residual solid compound was washed four times with 50 ml of toluene and then washed twice 50 ml of hexane. Thereafter, the solid compound was dried under reduced pressure to obtain 0.88 g of a flowable solid compound.

(2) Ethylene Polymerization

An autoclave (internal volume of 400 ml) equipped with a stirrer, wherein the atmosphere was dried under reduced pressure and then replaced with argon, was evacuated and 95 g of butane and 5 g of butene-1 were charged in the autoclave, followed by heating to 7° C. Ethylene was added so that its partial pressure became 6 kg/cm$^2$ and, after the system was stabilized, 0.25 ml of a heptane solution of triisobutylaluminum whose concentration was adjusted to 1 mmol/ml was charged. Then, 0.5 ml of a toluene solution of ethylenebis(indenyl)zirconium dichloride whose concentration was adjusted to 2 $\mu$/mol/ml was charged and 29.1 mg of the solid compound obtained in the (1) described above was charged as the solid catalyst component. The polymerization was carried out at 70° C. for 30 minutes while feeding ethylene so that the total pressured is held constant. As a result, 2.05 g of an olefin polymer was obtained. The polymerization activity per transition metal atom was 4.1× 10$^6$ g/mol Zr. hour and the polymerization activity per solid catalyst component was 141 g/g hour. The resulting olefin polymer has SCB of 21.1 and a melting point of 99.9° C.

EXAMPLE 12

(1) Preparation of Particles (A)

A 100 ml four neck flask equipped with a stirrer, a dropping funnel and a thermometer was dried under reduced pressure and then replaced with nitrogen. 0.90 g of the solid compound obtained in Example 10 (1) was charged in the flask. Then, 50 ml of toluene was added to form a slurry, and 1.80 ml of a toluene solution of pentafluoroaniline whose concentration was adjusted to 1 mmol/ml was slowly added. In that case, a gas was evolved. After stirring at room temperature for 30 minutes, then at 80° C. for 2 hours, the supernatant was removed by filtration and the residual solid compound was washed four times with 50 ml of toluene and then washed twice 50 ml of hexane. Thereafter, the solid compound was dried under reduced pressure to obtain 0.94 g of a flowable solid compound.

(2) Ethylene Polymerization

An autoclave (internal volume of 400 ml) equipped with a stirrer, wherein the atmosphere was dried under reduced pressure and then replaced by argon, was evacuated and 95 g of butane and 5 g of butene-1 were charged in the autoclave, followed by heating to 70° C. Ethylene was added so that its partial pressure became 6 kg/cm$^2$ and, after the system was stabilized, 0.25 ml of a heptane solution of triisobutylaluminum whose concentration was adjusted to 1 mmol/ml was charged. Then, 0.5 ml of a toluene solution of ethylenebis(indenyl)zirconium dichloride whose concentration was adjusted to 2 $\mu$mol/ml was charged and 32.2 mg of the solid compound obtained in the (1) described above was charged as the solid catalyst component. The polymerization was carried out at 70° C. for 30 minutes while feeding ethylene so that the total pressured is held constant. As a result, 4.48 g of an olefin polymer was obtained. The polymerization activity per transition metal atom was 9.0× 10$^6$ g/mol Zr. hour and the polymerization activity per solid catalyst component was 278 g/g hour. The resulting olefin polymer has SCB of 23.0, a melting point of 99.5° C. and [η] of 1.70.

EXAMPLE 13

(1) Contact Treatment Between Particles (a) and Organometallic Compound (b)

A 200 ml four neck flask equipped with a stirrer, a dropping funnel and a thermometer was dried under reduced pressure and then replaced by nitrogen. 4.92 g of silica (manufactured by CROSFIELD Co., Ltd., ES70X) heat-treated under a nitrogen flow at 300° C. for 5 hours was charged in the flask. Then, 50 ml of toluene was added to form a slurry, which was cooled to 5° C. in an ice bath and 10.0 ml of a toluene solution of trimethylaluminum whose concentration was adjusted to 1 mmol/ml was slowly added dropwise. In that case, a gas was evolved. After stirring at 5° C. for 30 minutes, then at room temperature for 2 hours, the supernatant was removed by filtration and the residual solid compound was washed four times with 100 ml of toluene and then washed twice with 100 ml of hexane. Thereafter, the solid compound was dried under reduced pressure to obtain 5.26 g of a flowable solid compound.

(2) Compound(c) Treatment

A 100 ml four neck flask equipped with a stirrer and a thermometer was dried under reduced pressure and then replaced by nitrogen. 3.19 g of the solid compound obtained in the (1) described above was charged in the flask. Then, 100 ml of toluene was added to form a slurry and 3.2 ml of a toluene solution of pentafluorophenol whose concentration was adjusted to 2 mmol/ml was slowly added. In that case, a gas was evolved. After stirring at room temperature for 3 hours, the supernatant was removed by filtration and the residual solid compound was washed four times with 50 ml of toluene and then washed twice with 50 ml of hexane. Thereafter, the solid compound was dried under reduced pressure to obtain 3.63 g of a flowable solid compound.

(3) Ethylene Polymerization

An autoclave (internal volume of 400 ml) equipped with a stirrer, wherein the atmosphere was dried under reduced pressure and then replaced with argon, was evacuated and 90 g of butane and 10 g of butene-1 were charged in the autoclave, followed by heating to 70° C. Ethylene was added so that its partial pressure became 6 kg/cm$^2$ and, after the system was stabilized, 0.25 ml of a heptane solution of triisobutylaluminum whose concentration was adjusted to 1 mmol/ml was charged. Then, 1.0 ml of a toluene solution of bis(cyclopentadienyl)zirconium dichloride whose concentration was adjusted to 1 $\mu$mol/ml was charged and 36.7 mg of the solid compound obtained in the (2) described above was charged as the solid catalyst component. The polymerization was carried out at 70° C. for 30 minutes while feeding ethylene so that the total pressured is held constant. As a result, 4.64 g of an olefin polymer was obtained. The polymerization activity per transition metal atom was 9.3×10$^6$ g/mol Zr. hour and the polymerization activity per solid catalyst component was 252 g/g hour. The resulting olefin polymer has SCB of 19.8, a melting point of 96.7° C. and [$\eta$] of 2.48.

EXAMPLE 14

(1) Ethylene Polymerization

An autoclave (internal volume of 400 ml) equipped with a stirrer, wherein the atmosphere was dried under reduced pressure and then replaced by argon, was evacuated and 100 g of butane and 4 ml of hexene-1 were charged in the autoclave, followed by heating to 70° C. Ethylene was added so that its partial pressure became 6 kg/cm$^2$ and, after the system was stabilized, 0.25 ml of a heptane solution of triisobutylaluminum whose concentration was adjusted to 1 mmol/ml was charged. Then, 1.0 ml of a toluene solution of dimethylsilylene(tetramethylcyclopentadienyl)(tert-butylamide) titanium dichloride whose concentration was adjusted to 1 $\mu$mol/ml was charged and 20.0 mg of the solid compound obtained in Example 13 (2) was charged as the solid catalyst component. The polymerization was carried out at 70° C. for 30 minutes while feeding ethylene so that the total pressured is held constant. As a result, 1.40 g of an olefin polymer was obtained. The polymerization activity per transition metal atom was 2.8×10$^6$ g/mol Zr. hour and the polymerization activity per solid catalyst component was 140 g/g hour. The resulting olefin polymer has SCB of 27.1, a melting point of 77.3° C. and 113.5° C.

EXAMPLE 15

(1) Contact Treatment Between Particles(a) and Organometallic Compound(b)

A 200 ml four neck flask equipped with a stirrer, a dropping funnel and a thermometer was dried under reduced pressure and then replaced with nitrogen. 9.26 g of silica (manufactured by CROSFIELD Co., Ltd., ES70X) heat-treated under a nitrogen flow at 300° C. for 5 hours was charged in the flask. Then, 92.6 ml of toluene was added to form a slurry, which was cooled to 5° C. in an ice bath and 18.5 ml of a toluene solution of trimethylaluminum whose concentration was adjusted to 1 mmol/ml was slowly added dropwise. In that case, a gas was evolved. After stirring at 5° C. for 30 minutes, then at room temperature for 2 hours, the supernatant was removed by filtration and the residual solid compound was washed four times with 100 ml of toluene and then washed twice with 100 ml of hexane. Thereafter, the solid compound was dried under reduced pressure to obtain 9.92 g of a flowable solid compound.

(2) Treatment of Compound(c)

The atmosphere in a 100 ml four neck flask equipped with a stirrer and a thermometer was dried under reduced pressure and then replaced by nitrogen. 5.45 g of the solid compound obtained in the (1) described above was charged in the flask. Then, 135 ml of toluene was added to form a slurry and 10.9 ml of a toluene solution of pentafluorophenol whose concentration was adjusted to 1 mmol/ml was slowly added. In that case, a gas was evolved. After stirring at room temperature for 30 minutes, then at 80° C. for 2 hours, the supernatant was removed by filtration and the residual solid compound was washed four times with 50 ml of toluene and then washed twice with 50 ml of hexane. Thereafter, the solid compound was dried under reduced pressure to obtain 6.11 g of a flowable solid compound.

(3) Ethylene Polymerization

An autoclave (internal volume of 1 liter) equipped with a stirrer, wherein the atmosphere was dried under reduced pressure and then replaced with argon, was heated to 80° C. and evacuated. Then, 20 g of NaCl powder was added and, furthermore, butene-1 and ethylene were charged at a partial pressure of 560 mmHg and 11 kg/cm$^2$, respectively, thereby to make the system stable. 1.0 ml of a heptane solution of triisobutylaluminum whose concentration was adjusted to 1 mmol/ml, 1.0 ml of a toluene solution of ethylenebis (indenyl)zirconium dichloride whose concentration was adjusted to 2 $\mu$mol /ml, 91.1 mg of the solid compound obtained in the (2) described above as the solid catalyst component, and 0.5 ml of hexane were contacted each other under an argon atmosphere for 30 seconds, and the resulting mixture was charged in the above autoclave. The polymerization was carried out at 80° C. for 1 hour substantially in the absence of a liquid while feeding a mixed gas of ethylene and butene-1 (content of butene-1: 6.3% by volume) so that the total pressured is held constant. The contents in the autoclave were washed with water and then dried to obtain 39 g of an olefin polymer. The polymerization activity per transition metal atom was 2.0×10$^7$ g/mol Zr. hour and the polymerization activity per solid catalyst component was 428 g/g hour. The resulting olefin polymer has SCB of 26.0, a melting point of 100.6° C., [$\eta$] of 1.61, Mw of 130,000, Mw/Mn of 4.4 and MFR of 0.33.

EXAMPLE 16

(1) Contact Treatment Between Particles(a) and Organometallic Compound(b)

A 100 ml four neck flask equipped with a stirrer, a dropping funnel and a thermometer was dried under reduced pressure and then replaced with nitrogen. 2.35 g of silica heat-treated at 300° C. (manufactured by Davison Co., Ltd., Sylopol 948; average diameter=55 $\mu$m; pore volume=1.66 ml/g; specific surface area=304 m$^2$/g; silica preserved under a nitrogen atmosphere after heat-treated at 300° C. by Davison Co., Ltd.) was charged in the flask. Then, 40 ml of toluene was added to form a slurry, which was cooled to 5° C. in an ice bath, and a mixed solution of 4.7 ml of a heptane solution of trimethylaluminum whose concentration was adjusted to 1 mmol/ml with 7 ml of toluene was slowly added dropwise. In that case, a gas was evolved. After stirring at 5° C. for 30 minutes, then at 80° C. for 2 hours, the supernatant was removed by filtration and the residual solid compound was washed four times with 50 ml of toluene and then washed twice with 50 ml of hexane. Thereafter, the solid compound was dried under reduced pressure to obtain 2.73 g of a flowable solid compound.

(2) Compound (c) Treatment

A 100 ml four neck flask equipped with a stirrer and a thermometer was dried under reduced pressure and then replaced with nitrogen. 2.44 g of the solid compound obtained in the (1) described above was charged in the flask. Then, 40 ml of toluene was added to form a slurry, and a mixed solution of 2.4 ml of a toluene solution of pentafluorophenol whose concentration was adjusted to 1.6 mmol/ml with 7 ml of toluene was slowly added. In that case, a gas was evolved. After stirring at room temperature for 30 minutes, then at 80° C. for 2 hours, the supernatant was removed by filtration and the residual solid compound was washed four times with 50 ml of toluene and then washed twice with 50 ml of hexane. Thereafter, the solid compound was dried under reduced pressure to obtain a flowable solid compound.

(3) Ethylene Polymerization

An autoclave (internal volume of 3 liter) equipped with a stirrer, wherein the atmosphere was dried under reduced pressure and then replaced with argon, was evacuated, and hydrogen was added so that its partial pressure became 60 mmHg, and 735 g of butane and 15 g of butene-1 were charged, followed by heating to 70° C. Ethylene was added so that its partial pressure became 6 kg/cm$^2$ and, after the system was stabilized, 0.9 ml of a heptane solution of triisobutylaluminum whose concentration was adjusted to 1 mmol/ml was charged. Then, 0.5 ml of a toluene solution of ethylenebis(2-methyl-indenyl)zirconium dichloride whose concentration was adjusted to 2 $\mu$mol/ml was charged and 29.4 mg of the solid compound obtained in the (2) described above was charged as the solid catalyst component. The polymerization was carried out at 70° C. for 60 minutes while feeding ethylene so that the total pressured is held constant. As a result, 41.8 g of an olefin polymer was obtained. The polymerization activity per transition metal atom was 4.2×10$^7$ g/mol Zr. hour and polymerization activity per solid catalyst. component was 1420 g/g hour. The resulting olefin polymer has SCB of 19.8, [η] of 1.30, Mw of 116000, Mn of 12000, Mw/Mn of 9.7, MFR of 1.41 g/10 min. and a density(without annealing) of 0.9154 g/cm$^3$.

EXAMPLE 17

(1) Ethylene Polymerization

An autoclave (internal volume of 3 liter) equipped with a stirrer, wherein the atmosphere was dried under reduced pressure and then replaced with argon, was evacuated, and hydrogen was added so that its partial pressure became 20 mmHg, and 725 g of butane and 25 g of butene-1 were charged, followed by heating to 70° C. Ethylene was added so that its partial pressure became 6 kg/cm$^2$ and, after the system was stabilized, 0.9 ml of a heptane solution of triisobutylaluminum whose concentration was adjusted to 1 mmol/ml was charged. Then, 1 ml of a toluene solution of ethylenebis(4,5,6,7-tetrahydroindenyl)zirconium dichloride whose concentration was adjusted to 1 $\mu$mol/ml was charged and 32.5 mg of the solid compound obtained in Example 16(2) described above was charged as the solid catalyst component. The polymerization was carried out at 70° C. for 60 minutes while feeding ethylene so that the total pressured is held constant. As a result, 43.5 g of an olefin polymer was obtained. The polymerization activity per transition metal atom was 4.4×10$^7$ g/mol Zr. hour and polymerization activity per solid catalyst component was 1340 g/g hour. The resulting olefin polymer has SCB of 16.0, [η] of 1.86, Mw of 110000, Mn of 40000, Mw/Mn of 2.8, MFR of 0.52 g/10 min. and a density(without annealing) of 0.9126 g/cm$^3$.

EXAMPLE 18

(1) Ethylene Polymerization

An autoclave (internal volume of 3 liter) equipped with a stirrer, wherein the atmosphere was dried under reduced pressure and then replaced with argon, was evacuated, and hydrogen was added so that its partial pressure became 50 mmHg, and 735 g of butane and 15 g of butene-1 were charged followed by heating to 70° C. Ethylene was added so that its partial pressure became 6 kg/cm$^2$ and, after the system was stabilized, 0.9 ml of a heptane solution of triisobutylaluminum whose concentration was adjusted to 1 mmol/ml was charged. Then, 1 ml of a toluene solution of dimethylsilylenebis(2-methyl-indenyl)zirconium dichloride whose concentration was adjusted to 1 $\mu$mol/ml was charged and 28.0 mg of the solid compound obtained in Example 16(2) described above was charged as the solid catalyst component. The polymerization was carried out at 70° C. for 60 minutes while feeding ethylene so that the total pressured was held constant. As a result, 65 g of an olefin polymer was obtained. The polymerization activity per transition metal atom was 6.5×10$^7$ g/mol Zr. hour and the polymerization activity per solid catalyst component was 2320 g/g hour. The resulting olefin polymer has SCB of 17.6, a melting point of 101.0° C., Mw of 227000, Mn of 59000, Mw/Mn of 3.8, and a density(without annealing) of 0.9058 g/cm$^3$.

EXAMPLE 19

(1) Ethylene Polymerization

An autoclave (internal volume of 3 liter) equipped with a stirrer, wherein the atmosphere was dried under reduced pressure and then replaced with argon, was evacuated and 720 g of butane and 30 g of butene-1 were charged, followed by heating to 70° C. Ethylene was added so that its partial pressure became 6 kg/cm$^2$ and, after the system was stabilized, 0.9 ml of a heptane solution of triisobutylaluminum whose concentration was adjusted to 1 mmol/ml was charged. Then, 1 ml of a toluene solution of bis(n-butylcyclopentadienyl) zirconium dichloride whose concentration was adjusted to 1 $\mu$mol/ml was charged, and then 35.3 mg of the solid compound obtained in Example 16(2) described above was charged as the solid catalyst component. The polymerization was carried out at 70° C. for 60 minutes while feeding ethylene so that the total pressured was held constant. As a result, 45.5 g of an olefin polymer was obtained. The polymerization activity per transition metal atom was 4.6×10$^7$ g/mol Zr. hour and the polymerization activity per solid catalyst component was 1290 g/g hour. The resulting olefin polymer has SCB of 21.4, [η] of 2.09, Mw of 125000, Mn of 67000, Mw/Mn of 1.9, MFR= 0.36 g/10 min. and a density(without annealing) of 0.9055 g/cm$^3$.

EXAMPLE 20

(1) Contact Treatment Between Particles(a) and Organometallic Compound(b)

A 100 ml four neck flask equipped with a stirrer, a dropping funnel and a thermometer was dried under reduced pressure and then replaced with nitrogen. 2.0 g of silica heat-treated at 300° C.(manufactured by Davison Co., Ltd., Sylopol 948; average diameter=55 $\mu$m; pore volume=1.66 ml/g; specific surface area=304 m$^2$/g; silica preserved under a nitrogen atmosphere after heat-treated at 300° C. by Davison Co., Ltd.) was charged in the flask. Then, 40 ml of toluene was added to form a slurry, which was cooled to 5° C. in an ice bath, and a mixed solution of 4.0 ml of a heptane solution of trimethylaluminum whose concentration was adjusted to 1 mmol/ml with 6.0 ml of toluene was slowly added dropwise. In that case, a gas was evolved. After stirring at 5° C. for 30 minutes, then at 80° C. for 2 hours, the supernatant was removed by filtration and the residual solid compound was washed four times with 50 ml of toluene. Then, 40 ml of toluene was added to form a slurry again, which was cooled to 5° C. in an ice bath, a mixed solution of 2.2 ml of a toluene solution of pentafluorophenol whose concentration was adjusted to 1.6 mmol/ml with 6 ml of toluene was slowly added. In that case, a gas was evolved. After stirring at 5° C. for 30 minutes, then at 80° C. for 2 hours, the supernatant was removed by filtration and the residual solid compound was washed four times with 50 ml of toluene and then washed twice with 50 ml of hexane. Thereafter, the solid compound was dried under reduced pressure to obtain a flowable solid compound.

(2) Ethylene Polymerization

An autoclave (internal volume of 3 liter) equipped with a stirrer, wherein the atmosphere was dried under reduced pressure and then replaced with argon, was evacuated, and hydrogen was added so that its partial pressure became 10 mmHg, and 650 g of butane and 100 g of butene-1 were charged followed by heating to 70° C. Ethylene was added so that its partial pressure became 6 kg/cm$^2$ and, after the system was stabilized, 0.9 ml of a heptane solution of triisobutylaluminum whose concentration was adjusted to 1 mmol/ml was charged. Then, 0.5 ml of a toluene solution of bis (1,3-dimethylcyclopentadienyl) zirconium dichloride whose concentration was adjusted to 2 $\mu$mol/ml was charged and 30.6 mg of the solid compound obtained in the (2) described above was charged as the solid catalyst component. The polymerization was carried out at 70° C. for 60 minutes while feeding ethylene so that the total pressured was held constant. As a result, 50.6 g of an olefin polymer was obtained. The polymerization activity per transition metal atom was 5.1×10$^7$ g/mol Zr. hour and the polymerization activity per solid catalyst component was 1650 g/g hour. The resulting olefin polymer has SCB of 17.8, [$\eta$] of 2.03, Mw of 131000, Mn of 50000, Mw/Mn of 2.6, MFR of 0.26 g/10 min. and a density(without annealing) of 0.9082 g/cm$^3$.

EXAMPLE 21

(1) Contact Treatment Between Particles(a) and Organometallic Compound(b)

A 200 ml four neck flask equipped with a stirrer, a dropping funnel and a thermometer was dried under reduced pressure and then replaced with nitrogen. 4.9 g of silica heat-treated at 800° C. (manufactured by Davison Co., Ltd., Sylopol 948; average diameter=54 $\mu$m; pore volume=1.66 ml/g; specific surface area=312 m$^2$/g; silica preserved under a nitrogen atmosphere after heat-treated at 800° C. by Davison Co., Ltd.) was charged in the flask. Then, 200 ml of toluene was added to form a slurry, which was cooled to 5° C. in an ice bath, and 4.9 ml of a toluene solution of trimethylaluminum whose concentration was adjusted to 2 mmol/ml was slowly added dropwise. In that case, a gas was evolved. After stirring at 5° C. for 6 hours, the supernatant was removed by filtration and the residual solid compound was washed four times with 200 ml of toluene and then washed twice with 200 ml of hexane. Thereafter, the solid compound was dried under reduced pressure to obtain 5.3 g of a flowable solid compound.

(2) Compound(c) Treatment

A 100 ml four neck flask equipped with a stirrer and a thermometer was dried under reduced pressure and then replaced with nitrogen. 2.6 g of the solid compound obtained in the (1) described above was charged in the flask. Then, 50 ml of toluene was added to form a slurry, and 2.6 ml of a toluene solution of pentafluorophenol whose concentration was adjusted to 2 mmol/ml was slowly added. In that case, a gas was evolved. After stirring at room temperature for 30 minutes, then at 80° C. for 2 hours, the supernatant was removed by filtration and the residual solid compound was washed four times with 50 ml of toluene and then washed twice with 50 ml of hexane. Thereafter, the solid compound was dried under reduced pressure to obtain 2.9 g of a flowable solid compound.

(3) Ethylene Polymerization

An autoclave (internal volume of 3 liter) equipped with a stirrer, wherein the atmosphere was dried under reduced pressure and then replaced with argon, was evacuated, and hydrogen was added so that its partial pressure became 50 mmHg, and 735 g of butane and 15 g of butene-1 were charged followed by heating to 70° C. Ethylene was added so that its partial pressure became 6 kg/cm$^2$ and, after the system was stabilized, 0.9 ml of a heptane solution of triisobutylaluminum whose concentration was adjusted to 1 mmol/ml was charged. Then, 0.5 ml of a toluene solution of ethylenebis(indenyl)zirconium dichloride whose concentration was adjusted to 2 $\mu$mol/ml was charged and 35.1 mg of the solid compound obtained in the (2) described above was charged as the solid catalyst component. The polymerization was carried out at 70° C. for 60 minutes while feeding ethylene so that the total pressured is held constant. As a result, 40 g of an olefin polymer was obtained. The polymerization activity per transition metal atom was 4.0×10$^7$ g/mol Zr. hour and the polymerization activity per solid catalyst component was 1140 g/g hour. The resulting olefin polymer has SCB of 18.5, a melting point of 107.1° C., [$\eta$] of 2.50, Mw of 118000, Mn of 13000, Mw/Mn of 8.9, MFR of 1.74 g/10 min. and a density(without annealing) of 0.9177 g/cm$^3$.

EXAMPLE 22

(1) Contact Treatment Between Particles(a) and Organometallic Compound(b)

A 300 ml four neck flask equipped with a stirrer, a dropping funnel and a thermometer was dried under reduced pressure and then replaced with nitrogen. 27.8 g of silica heat-treated at ° C. (manufactured by Davison Co., Ltd., Sylopol 948; average diameter=45.6 $\mu$m; pore volume=1.63 ml/g; specific surface area=527 m$^2$/g; silica preserved under a nitrogen atmosphere after heat-treated at 300° C. by Davison Co., Ltd.) was charged in the flask. Then, 170 ml of toluene was added to form a slurry, which was cooled to 5° C. in an ice bath, and 25.4 ml of a toluene solution of trimethylaluminum whose concentration was adjusted to 2.2 mmol/ml was slowly added dropwise. In that case, a gas was evolved. After stirring at 5° C. for 30 minutes, then at 80° C. for 2 hours, the supernatant was removed by filtration and the residual solid compound was washed four times with 170 ml of toluene and then washed twice with 170 ml of hexane. Thereafter, the solid compound was dried under reduced pressure to obtain 29.6 g of a flowable solid compound.

(2) Compound (c) Treatment

A 100 ml four neck flask equipped with a stirrer and a thermometer was dried under reduced pressure and then replaced with nitrogen. 1.76 g of the solid compound obtained in the (1) described above was charged in the flask. Then, 50 ml of toluene was added to form a slurry, and 3.5 ml of a toluene solution of pentafluorophenol whose concentration was adjusted to 1 mmol/ml was slowly added. In that case, a gas was evolved. After stirring at room temperature for 30 minutes, then at 80° C. for 2 hours, the supernatant was removed by filtration and the residual solid compound was washed four times with 50 ml of toluene and then washed twice with 50 ml of hexane. Thereafter, the solid compound was dried under reduced pressure to obtain 2.0 g of a flowable solid compound.

(3) Ethylene Polymerization

An autoclave (internal volume of 3 liter) equipped with a stirrer, wherein the atmosphere was dried under reduced pressure and then replaced with argon, was evacuated, and hydrogen was added so that its partial pressure became 50 mmHg, and 735 g of butane and 15 g of butene-1 were charged, followed by heating to 70° C. Ethylene was added so that its partial pressure became 6 kg/cm$^2$ and, after the system was stabilized, 0.9 ml of a heptane solution of triisobutylaluminum whose concentration was adjusted to 1 mmol/ml was charged. Then, 0.5 ml of a toluene solution of ethylenebis(indenyl)zirconium dichloride whose concentration was adjusted to 2 μmol/ml was charged and 36.3 mg of the solid compound obtained in the (2) described above was charged as the solid catalyst component. The polymerization was carried out at 70° C. for 60 minutes while feeding ethylene so that the total pressured was held constant. As a result, 120 g of an olefin polymer was obtained. The polymerization activity per transition metal atom was 1.2× 10$^8$ g/mol Zr. hour and polymerization activity per solid catalyst component was 3310 g/g hour. The resulting olefin polymer has SCB of 21.1, a melting point of 99.2° C. and 110.3° C., Mw of 84000, Mn of 26000, Mw/Mn of 3.2, MFR of 2.41 g/10 min. and a density(without annealing) of 0.9121 g/cm$^3$.

INDUSTRIAL APPLICABILITY

According to the present invention, there is provided particles capable of giving a polymer having high activity and excellent shape and particle properties when a catalyst for olefin polymerization obtained by using a transition metal compound is applied to the polymerization accompanying formation of polymer particles (e.g. slurry polymerization, gas phase polymerization) by using in combination with the transition metal compound. Moreover, a carrier of said particles, a catalyst for olefin polymerization of said particles, a catalyst for olefin polymerization using said particles, and a method for efficiently producing an olefin polymer having high molecular weight and narrow composition distribution using said catalyst for olefin polymerization are provided.

Therefore, its utilization value is great.

What is claimed is:

1. Modified particles obtained by a method which comprises contacting dry particles (a) with:
   (i) an organometallic compound (b) that consists essentially of a compound represented by the following general formula (1):

$$R^1{}_nAX_{q-n} \qquad (1)$$

wherein A represents a metal atom of the 2nd, 12th or 13th Group of the Periodic Table of Elements; R$^1$ represents a hydrocarbon group having 1 to 20 carbon atoms or a hydrocarbonoxy group having 1 to 20 carbon atoms and a plurality of R$^1$ may be the same or different; X represents a halogen atom or a hydrogen atom and a plurality of X may be the same or different; n represents a number satisfying the expression 0<n≦q; and q is a valence number of the metal atom; and then (ii) a compound (c) having a functional group containing an active hydrogen or a non-proton donative Lewis basic functional group, and an electron attractive group.

2. Modified particles according to claim 1, wherein the dry particles (a) are a porous substance.

3. Modified particles according to claim 1 or 2, wherein the dry particles (a) are made of an inorganic substance or organic polymer.

4. Modified particles according to claim 1 or 2, wherein the dry particles (a) are made of an inorganic substance heat-treated at 100 to 1500° C.

5. Modified particles according to claim 1, wherein the dried particles (a) are made of silica.

6. Modified particles according to claim 5, wherein the dry particles (a) are made of silica heat-treated at 200 to 800° C.

7. Modified particles according to claim 1, wherein the A is a boron atom, aluminum atom or magnesium atom or zinc atom.

8. Modified particles according to claim 1, wherein the A is a boron atom or aluminum atom.

9. Modified particles according to claim 1, wherein the A is an aluminum atom.

10. Modified particles according to claim 1, wherein the organometallic compound (b) is trialkylaluminum.

11. Modified particles according to any claim 1, wherein the functional group containing an active hydrogen is a hydroxyl group, mercapto group, amino group or phosphino group.

12. Modified particles according to claim 1, wherein the electron attractive group is a halogen atom.

13. Modified particles according to claim 1, wherein the compound (c) having a functional group containing an active hydrogen or a non-proton donative Lewis basic functional group, and an electron attractive group is a compound represented by the following general formula (2):

$$R^2{}_mZH_{z-m} \qquad (2)$$

wherein R$^2$ represents an electron attractive group or a group containing an electron attractive group; Z represents an atom of the 15th or 16th Group of the Periodic Table; H represents a hydrogen atom; and z represents the valence of Z, or 2 or 3, provided that: (i) m is 1 when z is 2, or (ii) m is 1 or 2 when z is 3.

14. Modified particles according to claim 13, wherein Z is a nitrogen atom, phosphorous atom, oxygen atom or sulfur atom.

15. Modified particles according to claim 14, wherein Z is a nitrogen atom or oxygen atom.

16. Modified particles according to any one of claims 13 to 15, wherein R$^2$ is a halogenated alkyl group, halogenated aryl group, cyanated aryl group, nitrated aryl group or ester group.

17. Modified particles according to claim 13, wherein R$^2$ is a halogenated hydrocarbon group.

18. Modified particles according to claim 17, wherein R$^2$ is a fluorinated alkyl group or fluorinated aryl group.

19. Modified particles according to claim 1, wherein a obtained treated particles after the contact are isolated.

20. A carrier comprising the modified particles of claim 1.

21. A catalyst component for olefin polymerization, comprising the modified particles of claim 1.

22. A catalyst for olefin polymerization, prepared by using the modified particles (A) of claim 1 and a transition metal compound(B).

23. A catalyst for olefin polymerization, prepared by using the modified particles (A) of claim 1, a transition metal compound(B) and an organometallic compound(C).

24. The catalyst for olefin polymerization according to claim 20 or 23, wherein the transition metal compound (B) is a metallocene transition metal compound.

25. The catalyst for olefin polymerization according to claim 23, wherein the organometallic compound(C) is an organoaluminum compound.

26. The catalyst for olefin polymerization according to claim 24, wherein the organometallic compound (C) is a compound represented by the following general formula (4):

$$R^4{}_b AlY_{3-b} \tag{4}$$

wherein $R^4$ represents a hydrocarbon group having 1 to 8 carbon atoms; Al represents an aluminum atom; Y represents a hydrogen atom and/or a halogen atom; and b represents a number satisfying the expression $0<b\leqq3$.

27. A method for producing an olefin polymer, which comprises polymerizing an olefin using the catalyst for olefin polymerization of claim 22.

28. The method of producing an olefin polymer according to claim 27, wherein the olefin is a mixture of ethylene and an α-olefin.

* * * * *